United States Patent [19]

Gillard et al.

[11] Patent Number: 5,384,670
[45] Date of Patent: Jan. 24, 1995

[54] DIGITAL DATA APPARATUS FOR PROVIDING SPATIAL MULTIPLEXING AND DEMULTIPLEXING OF COMPRESSED DATA TO BE RECORDED AND REPRODUCED

[75] Inventors: Clive H. Gillard, Basingstoke; James H. Wilkinson, Tadley, both of United Kingdom

[73] Assignee: Sony United Kingdom Limited, Staines

[21] Appl. No.: 55,256

[22] Filed: May 3, 1993

[30] Foreign Application Priority Data

Jul. 6, 1992 [GB] United Kingdom ............... 9214330

[51] Int. Cl.⁶ .................. G11B 5/09; G11B 15/14; H04N 5/76
[52] U.S. Cl. ........................ 360/48; 360/64; 358/335
[58] Field of Search ............. 360/32, 22, 23, 48, 360/61, 64, 51, 24; 348/423, 388, 721, 42, 448; 358/310, 335; 382/41

[56] References Cited

U.S. PATENT DOCUMENTS

| | | | |
|---|---|---|---|
| 4,484,236 | 11/1984 | Wilkinson | 360/64 X |
| 4,577,241 | 3/1986 | Wilkinson | 360/51 |
| 4,597,020 | 6/1986 | Wilkinson | 360/32 X |
| 4,603,350 | 7/1986 | Arbeiter et al. | 348/448 |
| 4,660,103 | 4/1987 | Wilkinson et al. | 360/48 X |
| 4,751,590 | 6/1988 | Wilkinson | 360/32 X |
| 5,043,826 | 8/1991 | Yoshio et al. | 358/335 |
| 5,107,345 | 4/1992 | Lee | 382/41 X |
| 5,175,631 | 12/1992 | Juri et al. | 358/310 X |
| 5,220,421 | 6/1993 | Chassaing et al. | 348/42 |
| 5,231,487 | 7/1993 | Hurley et al. | 348/391 |

FOREIGN PATENT DOCUMENTS 2140189 11/1984 United Kingdom.

Primary Examiner—Donald Hajec
Assistant Examiner—Patrick Wamsley
Attorney, Agent, or Firm—William S. Frommer; Alvin Sinderbrand

[57] ABSTRACT

Spatial demultiplexing of data (e.g. video data) is employed in a digital recorder comprising four heads (A, B, C, D) organized as 2 groups (A/C; B/D) each of 2 heads, whereby a field of data comprising a plurality of lines is spatially demultiplexed into i×4 data processing channels such that each data processing channel receives a different set of pixels including alternating pixels on every fourth line. The technique finds particular application to the recording of video data in compressed form as the distribution of the pixels to the data processing channels enables efficient compression to be achieved. The video data can be decorrelated before compression. The spatial demultiplexing is then performed on the decorrelated data.

54 Claims, 11 Drawing Sheets

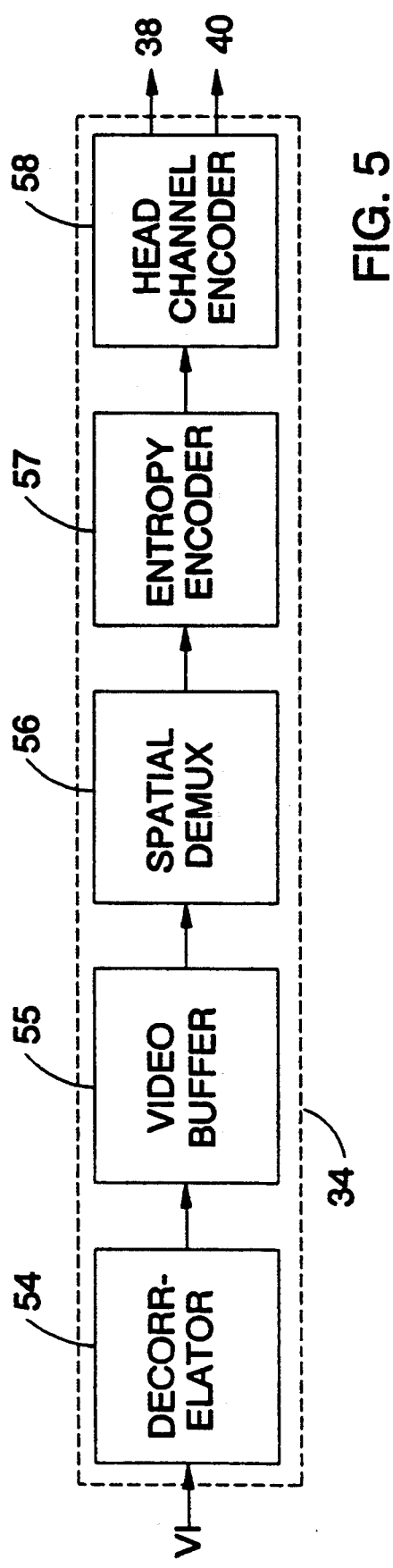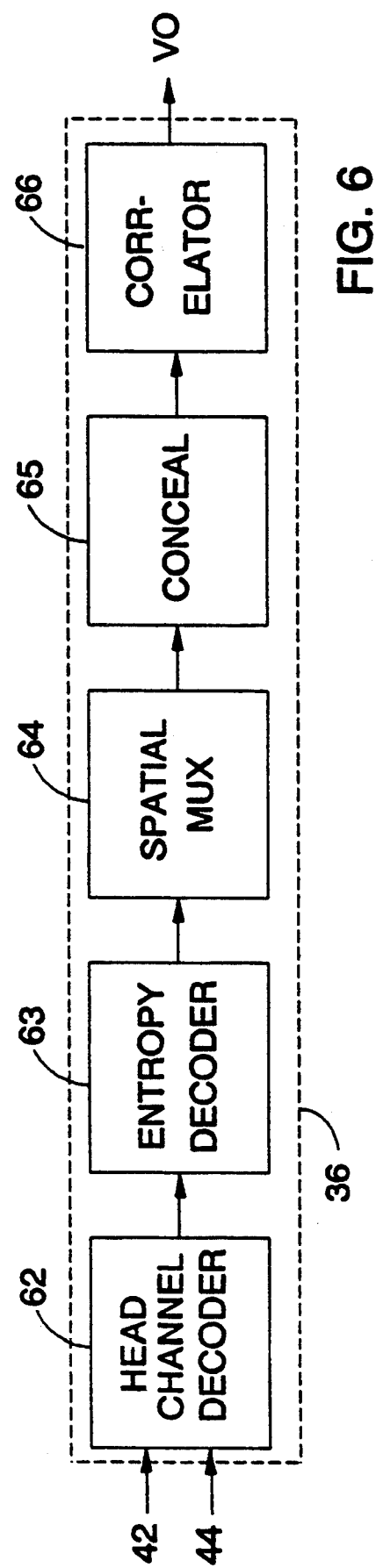

DIGITAL DATA APPARATUS FOR PROVIDING SPATIAL MULTIPLEXING AND DEMULTIPLEXING OF COMPRESSED DATA TO BE RECORDED AND REPRODUCED

BACKGROUND OF THE INVENTION

1. Field of the Invention

The invention relates to data processing apparatus for recording and/or replaying data (e.g video or image signals) with a plurality of heads on a recorder/player.

2. Description of the Prior Art

Given the high information densities and stringent requirements under which digital video tape recording systems operate, it is not practical to design systems in which no recording and/or playback errors occur. Typical of the sorts of problems which occur are the loss of data due to a recording or playback head becoming clogged with dirt and/or recording material from the tape, inhomogeneities in the recording layer(s) on the tape and scratches in the tape. Accordingly, known digital video tape recording systems include apparatus and methods for coping with errors which occur during the recording and/or playback of video information as part of the overall operation of such systems.

As a first level of protection against such errors, error correction codes are included with the recorded video data. If the error is a minor one then it is often possible to uniquely identify the particular piece or pieces of information that are in error and what data they should be replaced with. If the error is too severe, then such error correction cannot cope and then reliance is made upon error concealment techniques to reduce the perceivable effect of the error.

In order to facilitate error concealment, it is known to subsample the image data into a number of different data processing and recording channels. In this way, if an error occurs in one channel, then there will be data from the remaining channels surrounding the missing data points from the defective channel. For each erroneous pixel, a replacement pixel value can be interpolated from the surrounding pixel values from the other channels within the same field or frame or alternatively from the corresponding pixel position in preceding and/or following video fields or frames. While detail is still lost from the image by such errors, the overall effect of such error concealment is to make the error less immediately perceivable.

An example of digital video tape recorder apparatus employing such an approach to error handling is described in GB-A-2 140 189. In this known apparatus, with a recording head assembly having $2n$ heads, where $n$ is 1, 2 or 3, a demultiplexer demultiplexes video samples of an incoming digital television signal sample-by-sample into $2n$ channels for supply to the $2n$ recording heads and a switching arrangement for switching the connections between the channels and the heads line-by-line and possibly also field-by-field or frame-by-frame, of the television signal. Although GB-A-2 140 189 mentions the idea of switching the head allocation field-by-field or frame-by-frame, i.e. a temporal demultiplexing of the video signals, it does not describe a detailed implementation of this. In practice a sample-by-sample, or spatial demultiplexing of the video signals has to date been found sufficient.

GB-A-2 140 189 describes the demultiplexing of video data into four channels for supply to each of four heads A, B, C and D. A stream of video pixels for a video field is received as a stream of pixels, pixel-by-pixel from left to right within a scan line and line-by-line. The demultiplexing is applied in a cyclical manner so that successively received pixels are applied to a respective one of the heads A, B, C and D. To facilitate concealment of errors each pixel is arranged to be surrounded by eight pixels not processed by the same head, switching occurs between the heads A and C and between the heads B and D on a line-by-line basis. The result of the multiplexing operations described in GB-A-2 140 189 is that each line of pixels contains the sequence A, B, C, D, A, B, C, D, and so on, with, however, the sequence displaced in alternate lines by two pixel positions within that line. This simple structure always ensures that a pixel is surrounded by pixels from the other three heads.

The demultiplexing strategy described in GB-A-2 140 189 has been found to be satisfactory in most cases where digital pixel samples are recorded directly on tape.

In view of the high information densities involved in image data processing, particularly as image definition increases, it is desirable that some form of data compression be performed upon the image data before it is recorded. One set of techniques for achieving such data compression involves the transformation of the image data from the spatial domain into a transform domain. Once transformed into the transform domain, the redundancy within the image data can be better exploited to yield efficient compression. The data are stored or transmitted as an encoded version of the image in the transform domain.

The demultiplexing strategy described in GB-A-2 140 189 has been found not to be appropriate when the image pixel data are stored in compressed form on tape. For example, the transformation of the image data from the spatial domain into the transform domain can result in a number of pixels per line which is not divisible by four. Accordingly, if it is desired to use a tape transport mechanism with four heads, it is not possible to equally divide the pixels on a line between those four heads.

SUMMARY OF THE INVENTION

Accordingly an object of the present invention is to provide video data processing apparatus for digital tape recorder comprising a plurality of heads, which apparatus provides for the demultiplexing of input video data in a manner which enables effective concealment of recording/replay errors. An object of the invention is that the demultiplexing should be suitable for use with both recording systems employing data compression and recording systems not employing data compression.

In accordance with a first aspect of the present invention, there is provided digital data processing apparatus for processing data to be recorded on a recording medium by a recorder comprising $n \times m$ heads organized as m groups where each group comprises n record heads connected in common to a head channel for the group, the apparatus comprising means for receiving data to be recorded, means for spatially demultiplexing a field of data samples comprising a plurality of lines into $i \times n \times m$ data processing channels, means for processing the demultiplexed field of data samples in the data processing channels and means for providing at least one predetermined allocation of the data processing channels to the $m \times n$ heads, wherein the spatial demultiplexing means logically divides the field of data samples into blocks of n×n×m data samples dimensioned n data samples by n×m lines and assigns corresponding data samples within each block to a respective one of the i×n×m channels.

With spatial multiplexing means in accordance with the present invention, it is possible to reduce the number of different heads to which the samples (e.g. pixels) of a line of data (e.g. video) is distributed. This means that it is possible to evenly distribute the samples of a line to the separate data processing channels. Also the number of samples from a row which are processed by one data processing channel increases, and the distance between samples processed by a data processing channel decreases compared to the prior art. This has been found to be advantageous when run length coding is employed as a part of the compression process. It has been found that clusters of zero values tend to occur more in the horizontal than the vertical direction due to reduced alias. Accordingly, by reducing the distance between pixels processed by the run length encoder, the length of the runs can be increased and accordingly an improved compression can be achieved. The invention finds particular application to the recording of video data. However, it could also be applied to the recording of other data which is inherently redundant where concealment of recording errors is practical.

In the preferred embodiment, the spatial demultiplexing means assigns the data processing channels such that, for each allocation by the allocating means of the data processing channels to the heads, each of the data samples of a row within the block is assigned to a respective one of the n heads of a group of heads. The spatial demultiplexing means allocates the data processing channels such that, for each allocation by the allocating means of the data processing channels to the heads, each of the data samples of a column within the block is assigned to a respective one of the n×m heads such that no two adjacent data samples in the column are allocated to the same group of heads.

In accordance with a preferred embodiment of the invention, there is provided data processing apparatus for processing data to be recorded on a recording medium by a recorder comprising 4 heads organized as 2 groups where each group comprises 2 record heads connected in common to a head channel for the group, the apparatus comprising means for spatially demultiplexing a field of data samples comprising a plurality of lines into 4×i data processing channels, means for processing the demultiplexed field of data samples in the data processing channels and means for allocating the data processing channels to the 4 heads, wherein the spatial demultiplexing means assigns a different set of data samples to each data processing channel such that, for each allocation by the allocating means of the data processing channels to the heads, each set of data samples includes alternate data samples on every fourth line. Other numbers of heads and/or heads per group and/or groups can be envisaged within the scope of the present invention.

In one embodiment of the invention, the allocating means allocates two data processing channels to each of the heads for a field of video data (i.e. i=2). In this embodiment two data processing channels are recorded by each head during respective first and second sub-periods of a period when that head is active for the field of data samples and the spatial demultiplexing means assigns pixels to the data processing channels such that, for each allocation by the allocating means of the data processing channels to the heads, alternate data samples within a row are assigned to a respective one of the first and second sub-periods. This arrangement enables improved concealment of errors on replay. However, the number of data processing channels per head is not limited to two, but can be a larger or smaller number. For example, in another example of the invention the allocating means allocates one data processing channel to each of the heads for a field of video data (i.e. i=1) whereby one data processing channel is recorded by each head during a period when that head is active for the field of data samples and the spatial demultiplexing means assigns two data samples from each block of data samples to a respective one of the data processing channels.

Preferably, temporal demultiplexing of the data processing channels to the heads is provided to improve further concealment. To achieve temporal multiplexing, the allocating means switches the allocation of the data processing channels to the heads at successive timings.

In accordance with a further aspect of the invention, there is provided data processing apparatus for processing data to be recorded on a recording medium by a recorder comprising n×m heads organized as m groups where each group comprises n record heads connected in common to a head channel for the group, the apparatus comprising means for receiving data to be recorded, means for spatially demultiplexing a field of data samples comprising a plurality of lines into i×n×m data processing channels, means for processing the demultiplexed field of data samples in the data processing channels and means for allocating the data processing channels to the m×n heads, wherein the allocating means switches the allocation of the data processing channels to the heads at successive timings to provide temporal multiplexing of the data processing channels and wherein the allocating means comprises means for reallocating the channels between heads of a head channel and means for reallocating the channels between head channels.

Preferably, the heads within a group are arranged to be operable in respective time periods and the allocating means reallocates the data processing channels between the heads for successive time periods. In order to enable the recording of more than one data processing channel per head for each field, the allocating means allocates each of a plurality of data processing channels to the group of heads during respective sub-periods within the time period, whereby a plurality of the data processing channels are allocated sequentially to the head of that group operable during the time period. In the preferred embodiment of the invention the allocating means reallocates the channels to the heads for successive fields in a repeating eight field sequence.

The invention finds particular application to the recording of video data in compressed form where each of the data processing channels comprises means for compressing the video data. As mentioned above, the invention enables the efficiency of compression to be improved. However, the invention is also applicable to the storage of data which is not compressed.

The invention also provides data processing apparatus for a digital player comprising n×m replay heads for replaying information processed by a record processing apparatus and recorded on a recording medium in a spatially demultiplexed manner, the replay heads being connected to form m groups each of n heads, the data processing apparatus comprising head multiplexing means for multiplexing the recorded data into i×n×m data processing channels, means for processing the data in respective data processing channels and means for subsequently recombining the processed data to form output data, wherein the means for subsequently recombining the processed data comprises spatial multiplexing means for generating a field of data samples having a plurality of lines, the spatial multiplexing means logically dividing the field of data samples into a plurality of blocks of n×n×m data samples dimensioned n data samples by n×m lines and selecting corresponding data samples within each block from a respective one of the i×n×m channels.

The video processing apparatus is preferably provided with means for processing the data from tape to reconstructing the input video data, including means for concealing errors.

The invention further provides data processing apparatus comprising apparatus for recording and playing back information as defined above.

Moreover, the invention provides digital recording/playback apparatus comprising a tape transport including a plurality of heads on a rotating head mechanism for recording and/or replaying a tape with slanting tracks which extend diagonally across the tape in the apparatus as defined above.

Preferably, the heads of a group are disposed on a rotating head mechanism at a substantially equal angular spacing with respect to one another and with respective heads from each of said groups being disposed substantially adjacent to one another on the rotating head mechanism.

In order to provide for the recording of data from a plurality of data processing channels with one head where, in use, each head traces a slanting track across a tape during a time period when the head is operative, the allocating means is preferably arranged, during the time period, to allocate sequentially two data processing channels to the heads during respective sub-periods within the time period, whereby the first of the two data processing channels is allocated to a first portion of the track traced by the head and the second data processing channel is allocated to a second portion of the track traced by the head.

BRIEF DESCRIPTION OF THE DRAWINGS

FIG. 5 is a schematic block diagram of a first example of a record signal processing apparatus for FIG. 1;

FIG. 6 is a schematic block diagram of a first example of a replay signal processing apparatus for FIG. 1;

DESCRIPTION OF THE PREFERRED EMBODIMENT

Figure 1:
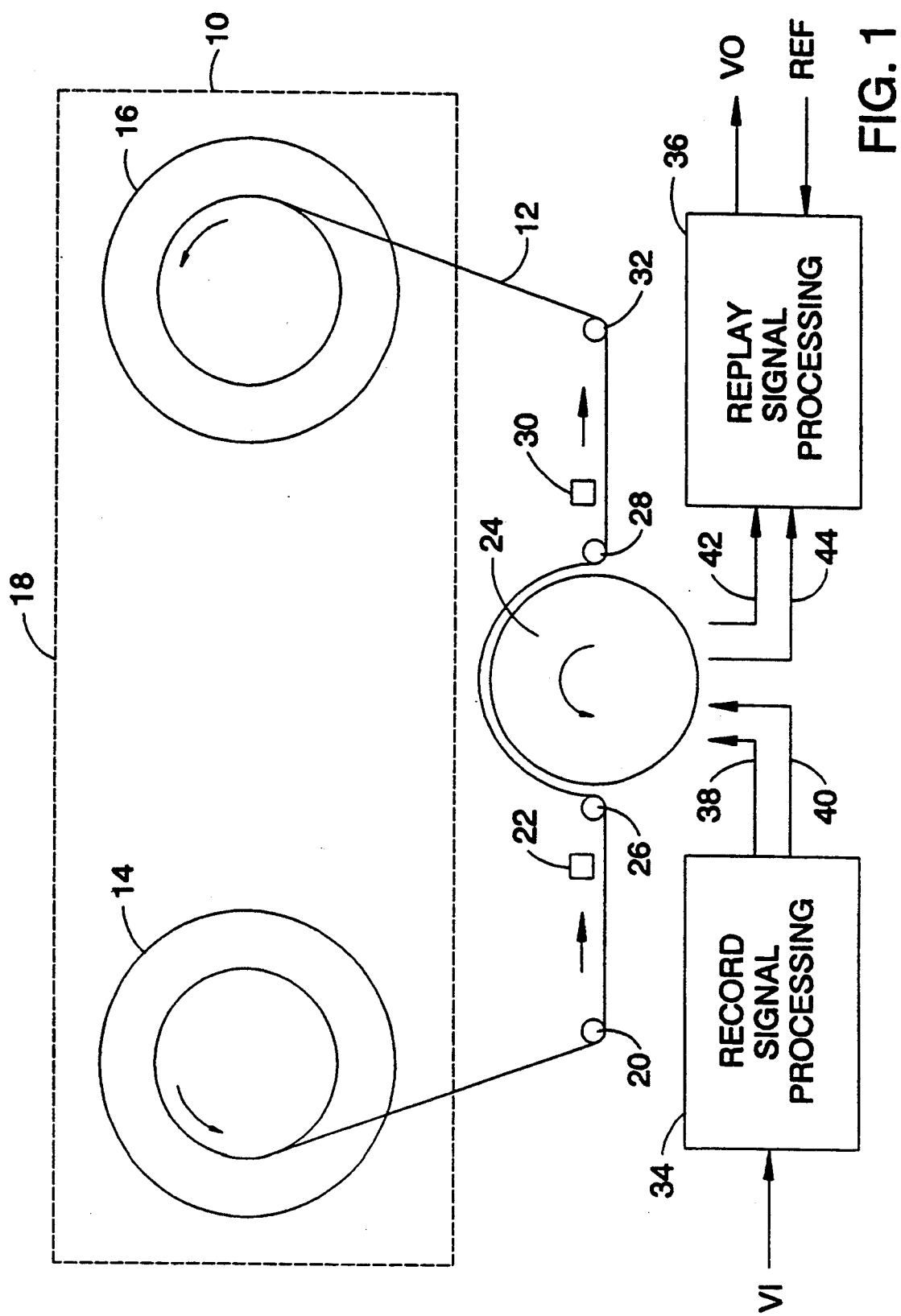
FIG. 1 is a schematic diagram giving an overview of a video tape system in accordance with the invention.

FIG. 1 is a schematic block diagram of a tape transport mechanism. FIG. 1 shows a helically scanned magnetic tape mechanism 10 in which magnetic tape 12 to be recorded or replayed is driven from a supply spool 14 to a take up spool 16 by a suitable drive motor (not shown). The supply spool 14 and the take up spool 16 may be housed within a tape cassette 18. The magnetic tape 12 from the supply spool 14 is guided by a guide roller 20 past a longitudinal record/replay head 22. The magnetic tape 12 then wraps around a rotary head drum 24, being guided by an entry guide roller 26 and an exit guide roller 28. When the magnetic tape 12 leaves the exit guide roller 28, it passes a second longitudinal record/replay head 30 and is then guided by a guide roller 32 onto the take up spool 16.

Record signal processing apparatus 34 receives digital video input signals, VI, for example from a camera after being processed through an analog-to-digital converter. The input digital video signals typically comprise multi-bit (for example 8 bit) samples or words, each representing a respective pixel of a scanned image or picture. The record signal processing apparatus 34 processes the signals before being passed to the heads of the tape transport mechanism via head channels 38 and 40 for storage on the tape 12. The processed video signals read from the tape 12 are supplied via head channels 42 and 44 to a replay processing apparatus 36 for generating output digital image signals VO. The replay signal processing apparatus 36 receives reference signals, REF, defining, among other things, output video rate timing signals.

The arrangement by which the magnetic tape is wrapped around the rotary head drum 24 will be described in more detail with reference to FIG. 2. The rotary head drum 24 carries four magnetic record/replay heads A, B, C and D, arranged in pairs with each pair being disposed at 180° with respect to the other. Heads A and B form one pair and heads C and D form the second pair. When a recording is being made on the magnetic tape 12, the record/replay heads on the rotary head drum 24 are supplied with suitable electrical record signals by the record processing apparatus 34 (see FIG. 1). The record processing apparatus supplies the record signals on two separate record head channels 38 and 40 (see FIG. 1): the first record head channel 38 is connected in common to heads A and C, whereby heads A and C form a first group of heads, and the second record head channel 40 is connected in common to heads B and D, whereby heads B and D form a second group of heads. Similarly first and second replay head channels 42 and 44 are connected to the first group of heads (A and C) and the second group of heads (B and D), respectively.

Figure 2:
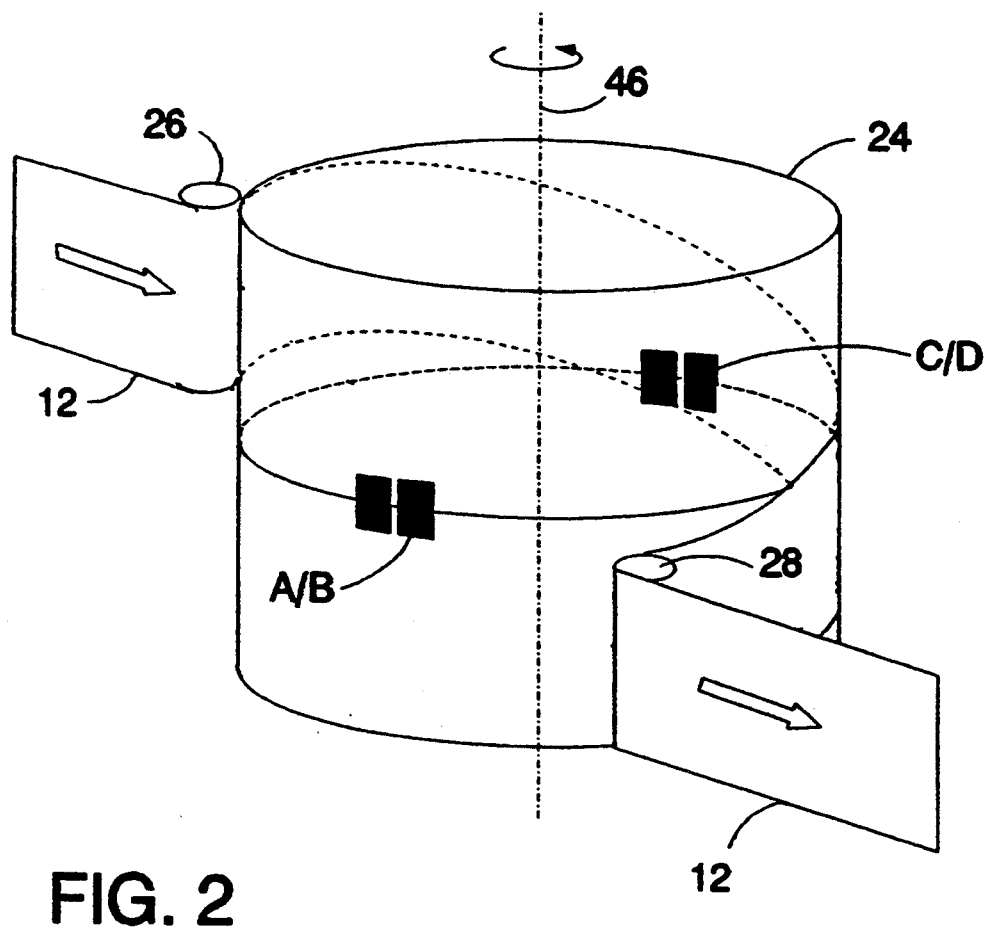
FIG. 2 is a schematic diagram illustrating a rotating head mechanism of the system of FIG. 1.

FIG. 2 is a schematic diagram of a rotary head drum 24 for use in a tape recorder as shown in FIG. 1. In use, the rotary head drum 24 rotates about an axis of rotation 46 at the video field frequency. For example, for a 50 Hz video field frequency, the rotary head drum rotates about the axis of rotation at 50 revolutions per second. The magnetic tape 12 is wrapped around the rotary head drum through an angle of about 180°. The magnetic tape is guided onto the rotary head drum by the entry guide roller 26 and is guided off the rotary head drum by the exit guide roller 28. The entry guide roller 26 is higher, in a direction parallel to the axis of rotation 46, than the exit guide roller 28. In this way, the magnetic tape 12 is guided in a gently descending spiral path around the periphery of the rotary head drum 24. The longitudinal speed of the magnetic tape 12 is such that during a single rotation of the rotary head drum 24, the tape advances by a distance which is very much smaller than the circumference of the rotary head drum 24. This arrangement means that data can be supplied alternately for head A and head C via a common head channel in respective time slots. The same applies for heads B and D.

Figure 3:
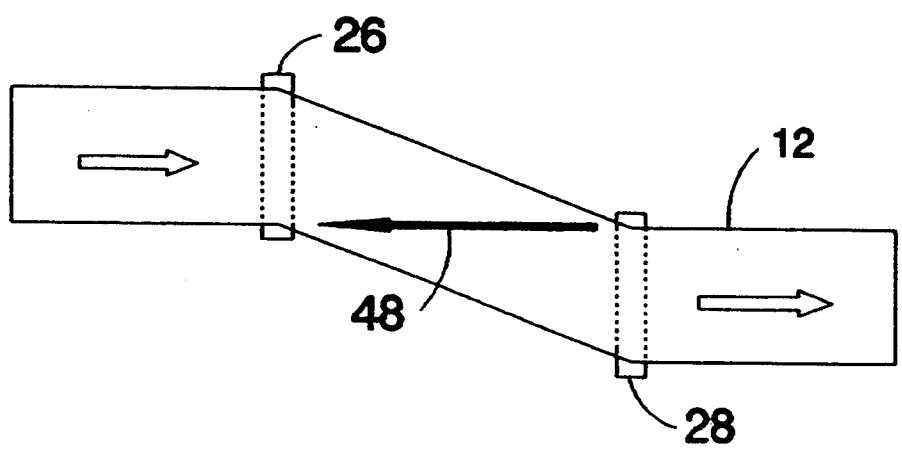
FIG. 3 is a schematic diagram illustrating the recording of track on a tape with the system of FIG. 1.
Figure 4:
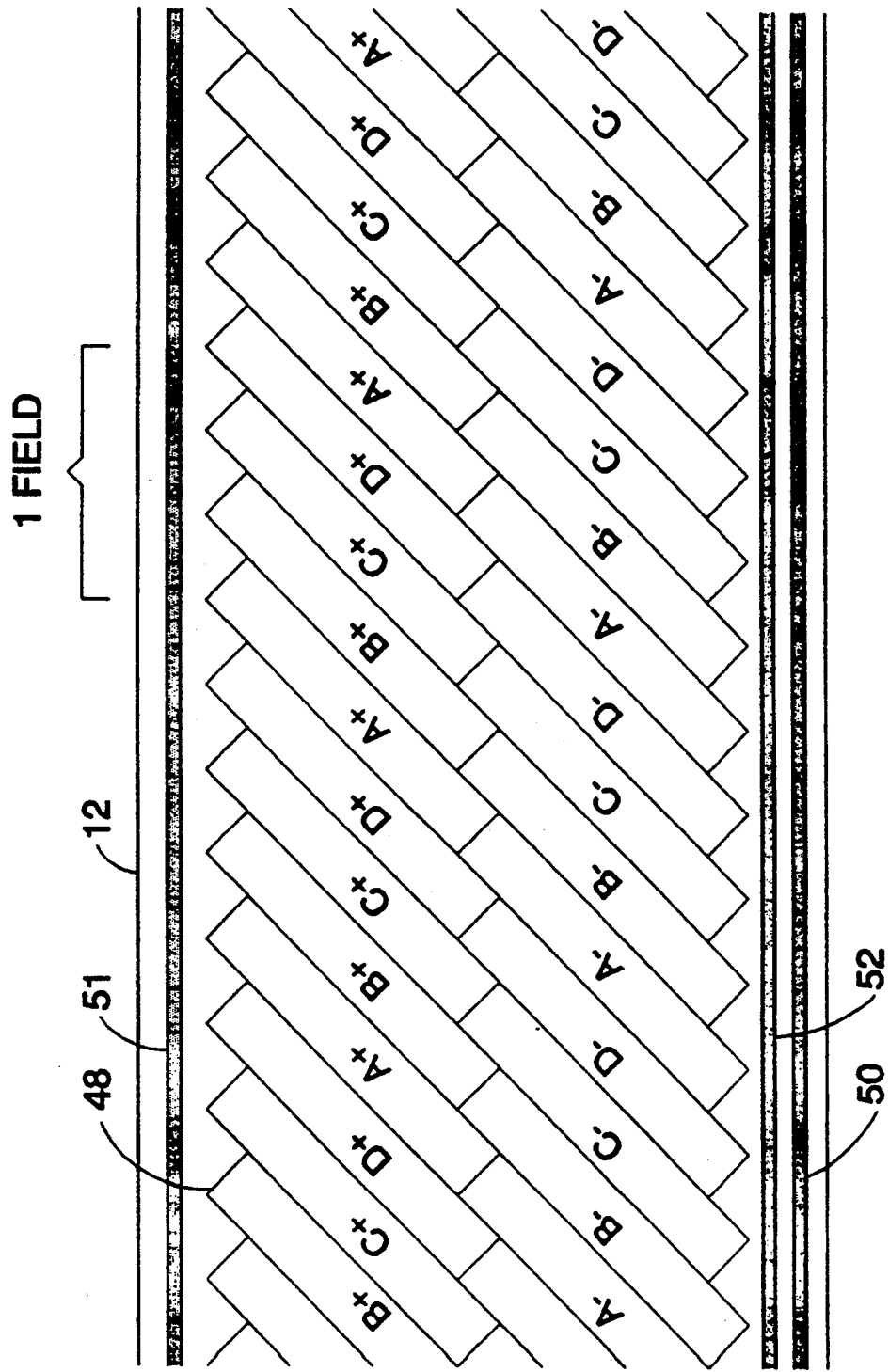
FIG. 4 is a schematic diagram illustrating data recorded on a tape with the system of FIG. 1.

FIG. 3 illustrates the path on the magnetic tape followed by one head on the rotary head drum 24. The entry guide roller 26 is in a higher plane than the magnetic record/replay heads A, B, C, D which are in turn higher than the exit guide roller 28. The result of this is that each head traces out a slanting oblique path (often termed a helical path) 48 on the tape. In FIG. 3, the angle of the path is exaggerated for clarity; in practice the oblique path 48 would be much longer than the width of the magnetic tape and would lie at an angle of about 45° to the edge of the tape. Because the tape is moving at a slow longitudinal tape speed the rotating magnetic record/replay heads A, B, C, D on the rotary head drum 24 form a succession of oblique record tracks 48 which are spaced longitudinally along the tape. FIG. 4 is a schematic representation of tracks recorded on the tape in an embodiment of the present invention showing the oblique tracks 48 on the tape. Successive tracks are recorded by the heads A, B, C and D respectively. Four tracks correspond to one field of input video. It can be seen that each of the tracks A, B, C, D, is labelled, respectively, A−, B−, C−, D− and in the upper area of the track A+, B+, C+, D+. As will be explained later, the data stored on the tape are derived from eight data processing channels.

In addition to the oblique tracks 48, a linear track 50 for time code information, a linear track 51 for analog audio (audio cue) information and a linear track 52 for further audio information are provided by means of the linear record heads.

FIGS. 5 and 6 are schematic block diagrams giving an overview of record signal processing apparatus and replay signal processing apparatus, respectively, for a system employing the recording of digital video signals in compressed form.

In the record signal processing apparatus in FIG. 5, the input digital video signal VI is supplied to a decorrelator 54 which transforms the video image from the spatial to a transform domain. The decorrelation can be performed, for example, by sub-band coding or discrete cosine transform (DCT) techniques. Techniques of this sort are described, for example, in UK patent application No. 9100592.6 which is incorporated herein by reference.

The decorrelation operation performed by the decorrelator 54 relies on the fact that neighboring pixels of an image are highly correlated, whereby processing as image (for example a field or frame of a video signal) to form frequency separated signal portions representing different components of the image in the two dimensional spatial frequency domain enables a reduction in the amount of information needed to represent the image. Specifically, the frequency separated signal portions represent different spatial frequency components of the image.

The decorrelated image is stored in a video buffer 55. The spatial demultiplexer 56 controls the output from the video buffer 55, dividing the decorrelated video data in the video buffer 55 into a plurality (in the preferred embodiment 8) of data processing channels. The output from the spatial demultiplexer 56 is supplied to an entropy encoder 57 which compresses the decorrelated and demultiplexed video data. The output of the entropy encoder 57 is then supplied to a head channel encoder 58. The head channel encoder 58 performs error correction encoding and temporal demultiplexing on the decorrelated and compressed data for storage on tape via the two head channels 38 and 40.

In the replay signal processing apparatus in FIG. 6, the head channel decoder 62 performs the decoding of blocks of data from tape and the temporal multiplexing of the data from the head channels into the 8 data processing channels. The output of the head channel decoder 62 is then passed to an entropy decoder 63. The entropy decoder 63 includes a video buffer for receiving the output of the head channel decoder and logic for decompressing the compressed data. The decompressed data from the entropy decoder 63 are then spatially multiplexed in a spatial multiplexer 64, which essentially performs the inverse operation of the spatial demultiplexer 56. The output of the spatial multiplexer 64 comprises a stream of video data in the transform domain, certain blocks of which may contain data errors identified as a result of the error correction processing in the head channel decoder 62. A concealment processor 66 is employed to conceal data relating to erroneous blocks. A suitable concealment processor is described in co-pending UK patent application 9200433.2 which is incorporated herein by reference. The output of the concealment processor 66 is supplied to the correlator or interpolator 66 for reconstituting the video data in the spatial domain for output VO.

Figure 7A:
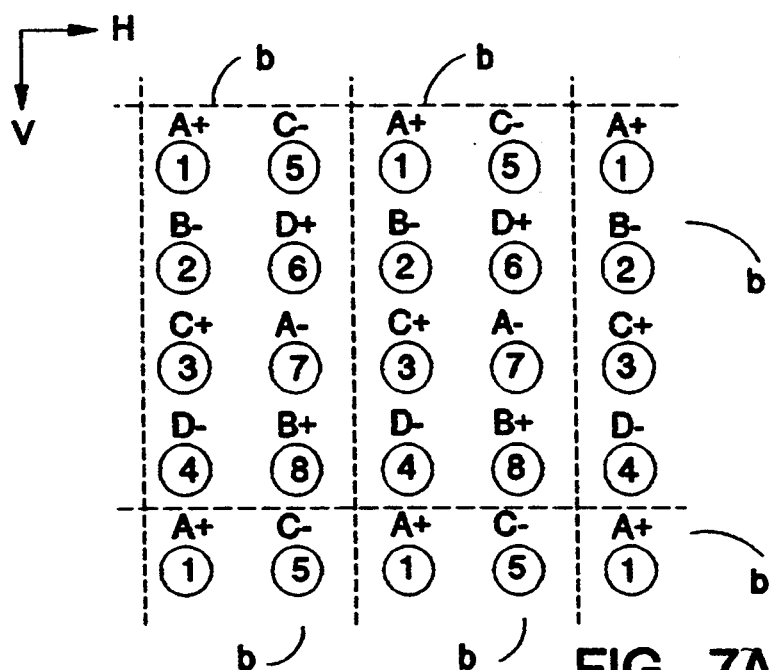
FIGS. 7A and 7B illustrate the spatial demultiplexing of the input video by a spatial demultiplexer of the first example of the record signal processing apparatus of the present invention.

FIG. 7A illustrates how the spatial demultiplexer 56 separates or demultiplexes the data from the video buffer 55 into eight data processing channels. The decorrelated video data are stored in the video buffer 55 as an array comprising rows and columns of video samples. The video samples result from the transformation of the pixels of an input video field from the spatial to a transform domain. A particular lay-out and format for the samples in the video buffer 55 is not essential to the present invention. However, the samples are arranged in the video buffer such that they may be accessed in terms of rows and columns. As an example, if a sub-band coding approach to decorrelation is employed, as described in the aforementioned co-pending UK application No. 9100592.6, the decorrelated video data comprise 64 sub-pictures for each field of input video. The sub-pictures are arranged as an eight by eight matrix. Each sub-picture comprises a two-dimensional array of samples. Thus, it will be appreciated that a decorrelated field of video data can be processed as a two-dimensional array of samples comprising rows and columns of those samples.

The spatial demultiplexer 56 scans the array of samples in the video buffer 55 a total of 8 times for each video field. On each scan of the stored data different pixel samples are read so that after the eighth scan all the samples of the array each sub-pixel have been read. In the preferred embodiment every second pixel on every fourth line is selected for each channel as indicated in FIG. 7, which represents the top left corner of the array of samples. Thus the horizontal axis represents the horizontal direction within the decorrelated image and the vertical axis represents the vertical direction within the decorrelated image. The eight data processing channels are referenced 1–8 and are assigned labels A+, A−, B+, B−, C+, C−, D+, D−. The labels A+ to D− refer to an allocation of the data processing channels to the sub-tracks on the tape (i.e- to selected heads at selected timings) for one field of an eight field sequence as will be explained later.

As can be seen in FIG. 7A, the spatial demultiplexer 56 logically divides the field of video data into blocks 'b' and assigns samples at corresponding positions in each of the blocks to the same one of eight channels. In particular the spatial demultiplexer 56 assigns the samples of the field of video data as follows: samples 1, 3, 5, etc. on lines 1, 5, 9, etc. to a first data processing channel; samples 1, 3, 5, etc. on lines 2, 6, 10, etc. to a second data processing channel; samples 1, 3, 5, etc. on lines 3, 7, 11, etc. to a third data processing channel; samples 1, 3, 5, etc. on lines 4, 8, 12, etc. to a fourth data processing channel; samples 2, 4, 8, etc. on lines 1, 5, 9, etc. to a fifth data processing channel; samples 2, 4, 8, etc. on lines 2, 6, 10, etc. to a sixth data processing channel; samples 2, 4, 8, etc. on lines 3, 7, 11, etc. to a seventh data processing channel; and samples 2, 4, 8, etc. on lines 4, 8, 12, etc. to an eighth data processing channel.

In other words the samples are assigned in accordance with a pattern which repeats for the 2×4 pixel blocks indicated in FIG. 7A.

Figure 7B:
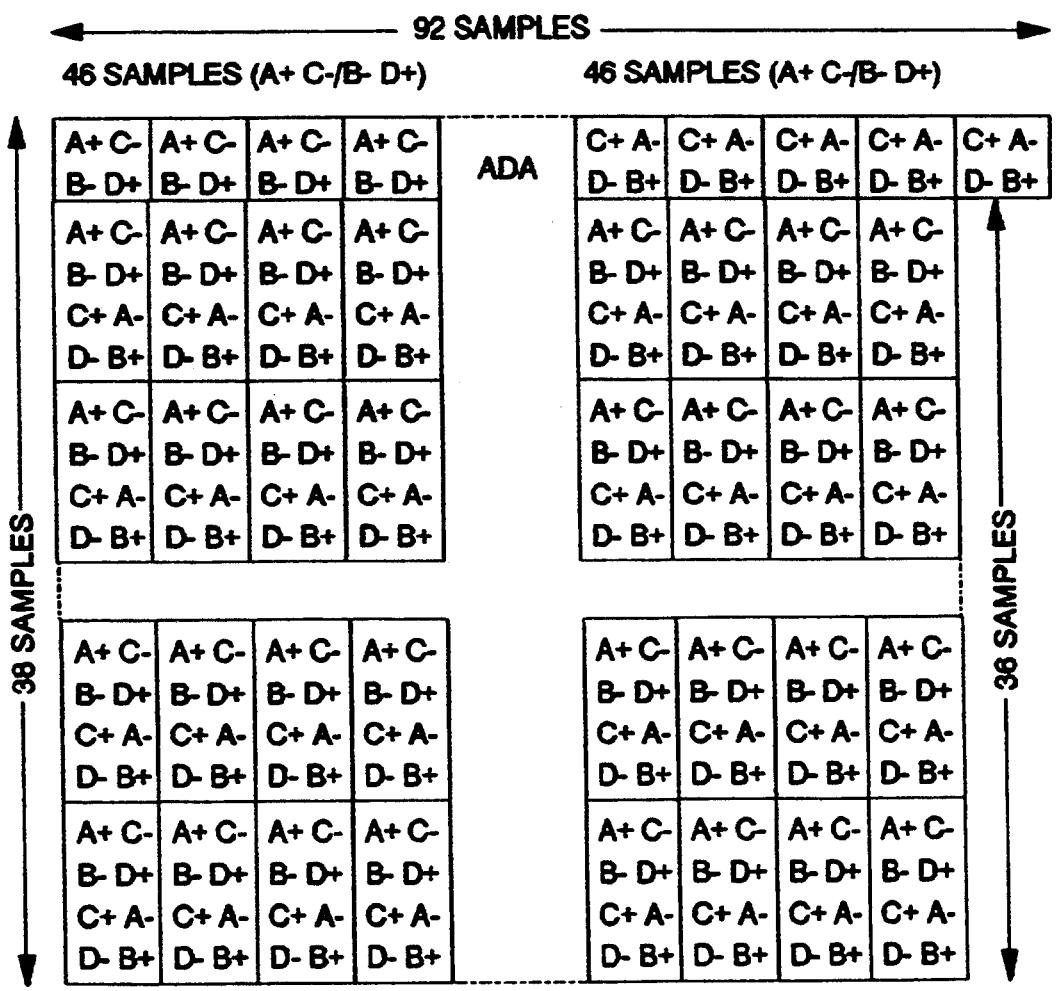

FIG. 7B corresponds generally to FIG. 7A, but a specific distribution of samples for a particular example of the invention. In FIG. 7B, the allocation of the data processing channels for one field of the aforementioned eight field sequence is shown. This example is for a 625 line PAL television system having an active picture area of 720 pixels by 288 lines. An eight by eight sub-band coding process is used to decorrelate the input video pictures and produce 64 sub-pictures where each sub-picture represents the data from one of the 64 sub-bands. Each sub-picture thus comprises 90 picture samples in 36 lines. Demultiplexing the sub-picture into 8 channels in the spatial demultiplexer means that each of the channels contains 64 sub-pictures which in turn contain 45 pixels by 9 lines.

In addition to the active video samples 16 lines of ancillary data need to be recorded for each sub-picture so that each sub-picture actually contains 90 pixels by 38 lines. The two top lines shown in FIG. 7B represent the two extra lines for the ancillary data and is referred to as an ancillary data area (ADA). Comparison of FIGS. 7A and 7B show the same spatial distribution for the video data.

The ancillary data are distributed as follows: for the first line, the first 46 ancillary samples of each sub-picture are demultiplexed between channel A+ and C−. The remaining 44 ancillary samples are demultiplexed between channels C+ and A−. An extra two samples (the 91st and 92nd samples in the first line) are added to the A+ and C− channels to equalize the number of samples between those channels. On the second line, the first 46 ancillary samples of each sub-picture are demultiplexed between channels B− and D+, the remaining 44 ancillary samples are demultiplexed between channels D− and B+. An extra two samples (the 91st and 92nd samples in the second line) are added to the D− and B+ channels to equalize the number of coefficients between channels. The 91st and 92nd horizontal samples in each of the first and second lines are always zero when processed by the spatial demultiplexer. These samples do not exist in the decorrelator 54 or the correlator 66, although they do exist in the entropy encoder 57 and entropy decoder 63. By interleaving the ancillary data in this way, most of the benefits of the eight way demultiplex structure used in the active video data are maintained.

Figure 7C:
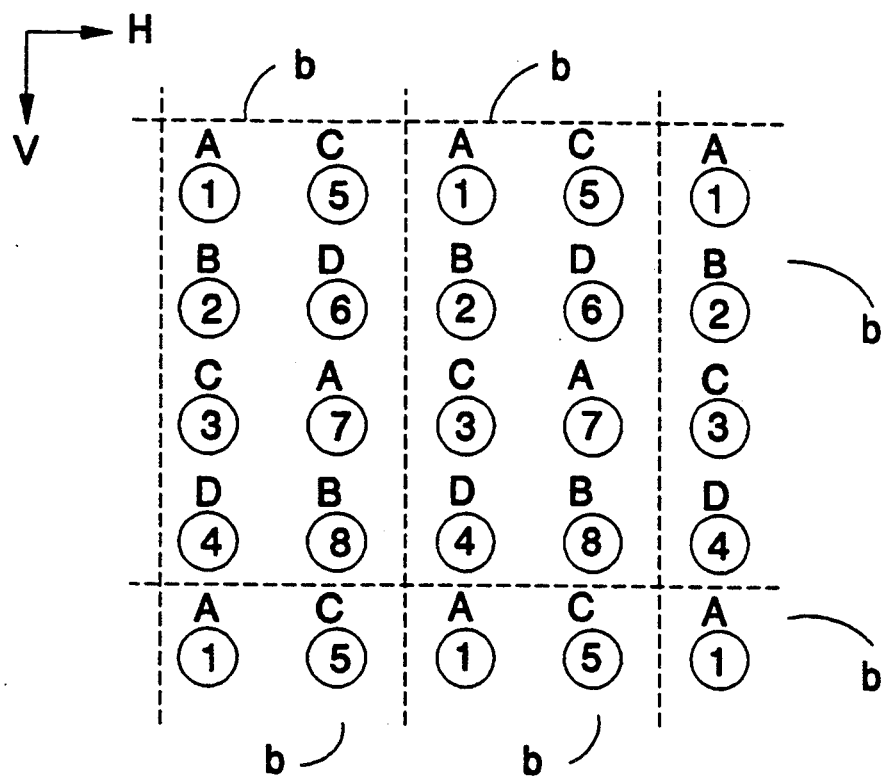
FIG. 7C illustrates the spatial demultiplexing of a second example of the invention.

FIG. 7C relates to a second example of the present invention and will be referred to later.

In the present embodiment each of the eight data processing channels is processed in a time-multiplexed manner, although it will be appreciated that it could be processed by separate hardware channels. Thus the data for the respective data processing channels are supplied in respective time slots to the entropy encoder 57 for further processing.

The purpose of the entropy encoder 57 is to compress the data. Preferably, compression is performed by quantizing the output of the spatial demultiplexer 56 and then encoding the quantized signals using a run-length encoding technique. In other words, runs of zeros terminated by a non-zero value are replaced by a code representing the length of the run of zero values. Similarly run length codes representing runs of non-zero values can be employed. The degree of compression can be further enhanced by choosing an appropriate representation of the run-length codes. For example, Huffman codes may be employed. The exact details of the run-length encoding is not important to the present invention. Moreover, runlength coding techniques are, in themselves well known.

A description of how Huffman codes can be allocated to appropriate events is given in the book entitled "Coding and Information Theory" by R. W. Hanirning in Chapter 4, pages 64 to 68 (ISBN 0-13-139139-9).

The entropy encoder processes the data for each of the 8 data processing channels output by the spatial demultiplexer 56 in respective time slots. In other words, each of the 8 data processing channels is processed sequentially by common hardware. However, it will be appreciated that the data for the 8 channels could be processed by separate hardware in parallel.

The entropy encoded data for each of the separate data processing channels for each field of video are supplied in respective time slots to the head channel encoder 58 for further processing.

Figure 8:
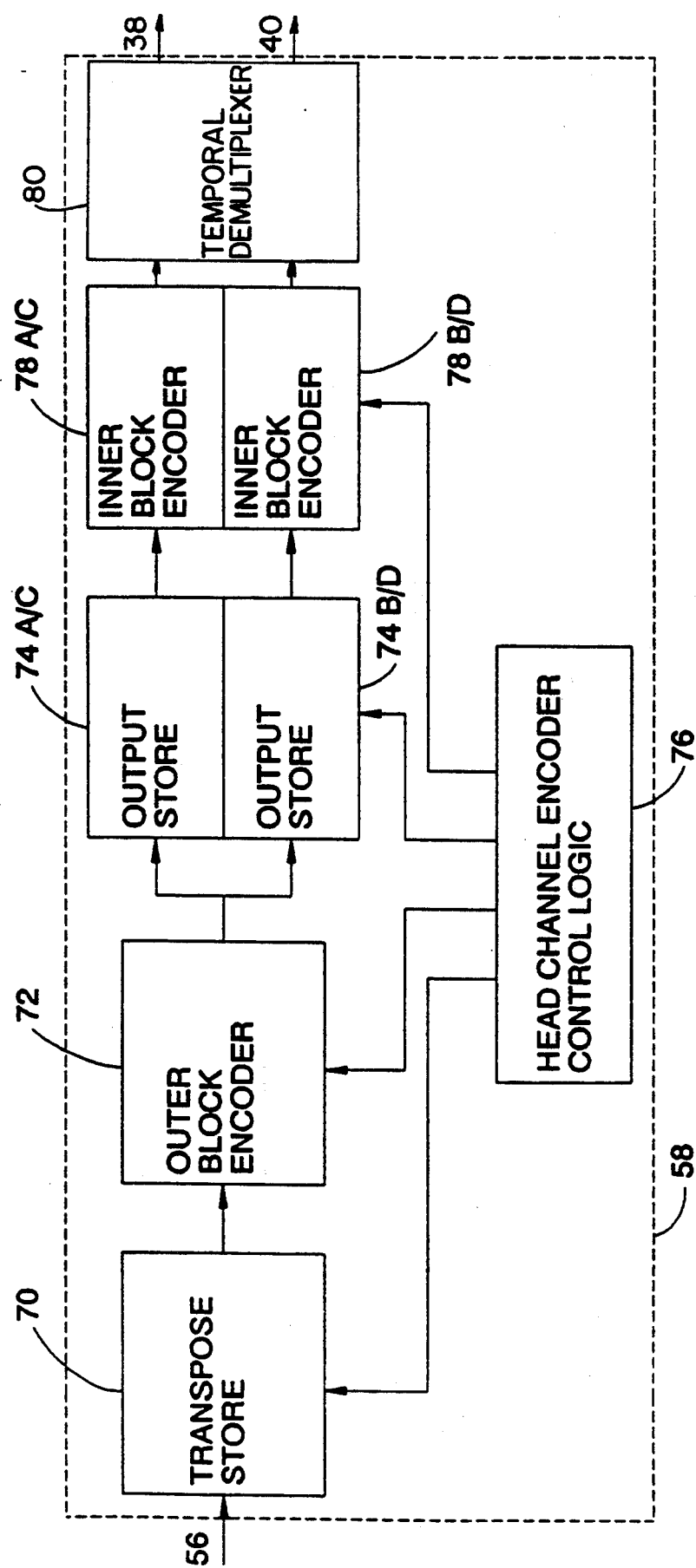
FIG. 8 is a schematic block diagram of a head channel encoder of the record signal processing apparatus.

FIG. 8 is a schematic block diagram of the head channel encoder 58, which comprises a transpose store 70, an outer block error correction encoder 72, first and second output stores 74 A/C and 74 B/D, head channel encoder control logic 76, first and second inner block error correction encoders 78 A/C and 78 B/D and temporal demultiplexer 80. The inner block error encoder adds inner block correction data to each of the inner blocks from the field store 68 of the entropy encoder. It also adds a 2 byte synchronization word and two bytes of block identification information. However, before it does this, the outer block encoder generates a further number of inner blocks which can be used to correct certain other inner blocks which could not be corrected by the inner block correction itself.

Figure 9A:
FIGS. 9A and 9B illustrate a block structure for storing data on tape.
Figure 9B:
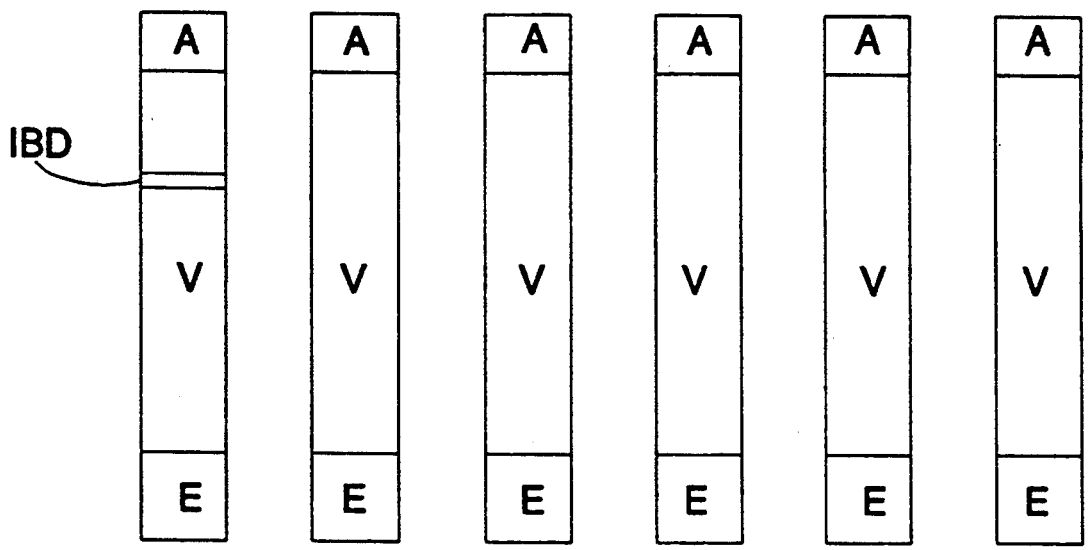

FIGS. 9A and 9B illustrate a block structure for the storage of digital data on tape. FIG. 9A is a schematic diagram showing the structure of one of the inner blocks mentioned above. Each inner block comprises 2 bytes of synchronization information ("S"), 2 bytes of inner block identification (ID) information ("I"), 4 bytes of compression coding header information ("CC"), 120 bytes of data ("DATA"), and 8 bytes of error correcting code ("ECC"). FIG. 9B illustrates six so-called product blocks. Each of the product blocks is 124 bytes wide (i.e. the same size as the data field of an inner block). One inner block data field is represented with the reference IBD in the left hand product block shown in FIG. 9B. The video data of 38 inner data blocks are stored in the area labelled "V" in each of the product blocks. Also stored therein are 4 rows of audio inner blocks. A product block is completed through the provision of four 124 byte wide error correction codes in the area labelled "E" Each product block contains 124 byte-wide columns. One byte-wide column is termed an outer block.

Returning to FIG. 8, the operation of the head channel encoder 58 will now be described in more detail with reference to the block structure shown in FIGS. 9A and 9B. The video data inner blocks for one time slot (i.e. one data processing channel) from the field store 68 of the entropy encoder 24 are read into the transpose store 70 row by row from top to bottom (as shown in the product blocks in FIG. 9B) and within each row from left to right. The video data inner blocks compose the video data and compression coding header information. Corresponding audio data inner blocks are also read into the transpose store row by row and within each row from left to right. This data are then read out of the transpose store 70 column by column from left to right and within each column from top to bottom. Reading the data in this transposed manner permits the outer block encoder 72 to compute the error correction codes "E" shown in FIG. 9B for the columns (i.e. the outer blocks) of the video and audio data, "V" and "A", shown in FIG. 9B.

The output of the outer block error correction encoder during one time slot (i.e. for a data processing channel) is then stored in one of the output stores 74 A/C or 74 B/D under the control of the head channel encoder control logic 76. One output store 74 A/C is used to contain the data for the first head channel 15 and the second output store 74 B/D is used to contain the data for the other head channel 16. The data are written into the output stores column by column from left to right (as represented in FIG. 12B) and within each column from top to bottom. The output stores are read so as to perform a further transpose function by reading the data row by row from top to bottom and within each row from left to right. Thus, when the data are read from the output stores 74 it is in the inner block format. The synchronization "S", the inner block ID "I" and the inner block error correction "ECC" information are added by the appropriate inner block encoder 78 A/C or 78 B/D. The completed inner blocks are supplied via temporal demultiplexer 80 and the head channels 15 and 16 to the tape transport to be recorded on tape.

The error correction encoding processes performed by the inner and outer block encoders will not be described in further detail herein as the choice of a particular error encoding process is not required by the present invention. A conventional error correction encoding process such as one using Reed-Solomon codes can be used.

The inner block ID "I" identifies the inner block number, the video field, frame and frame pair number from an eight field sequence to which the inner data block relates and a head track and sub-track onto which the data are to be recorded as defined by the temporal demultiplexing sequence.

Figure 10:
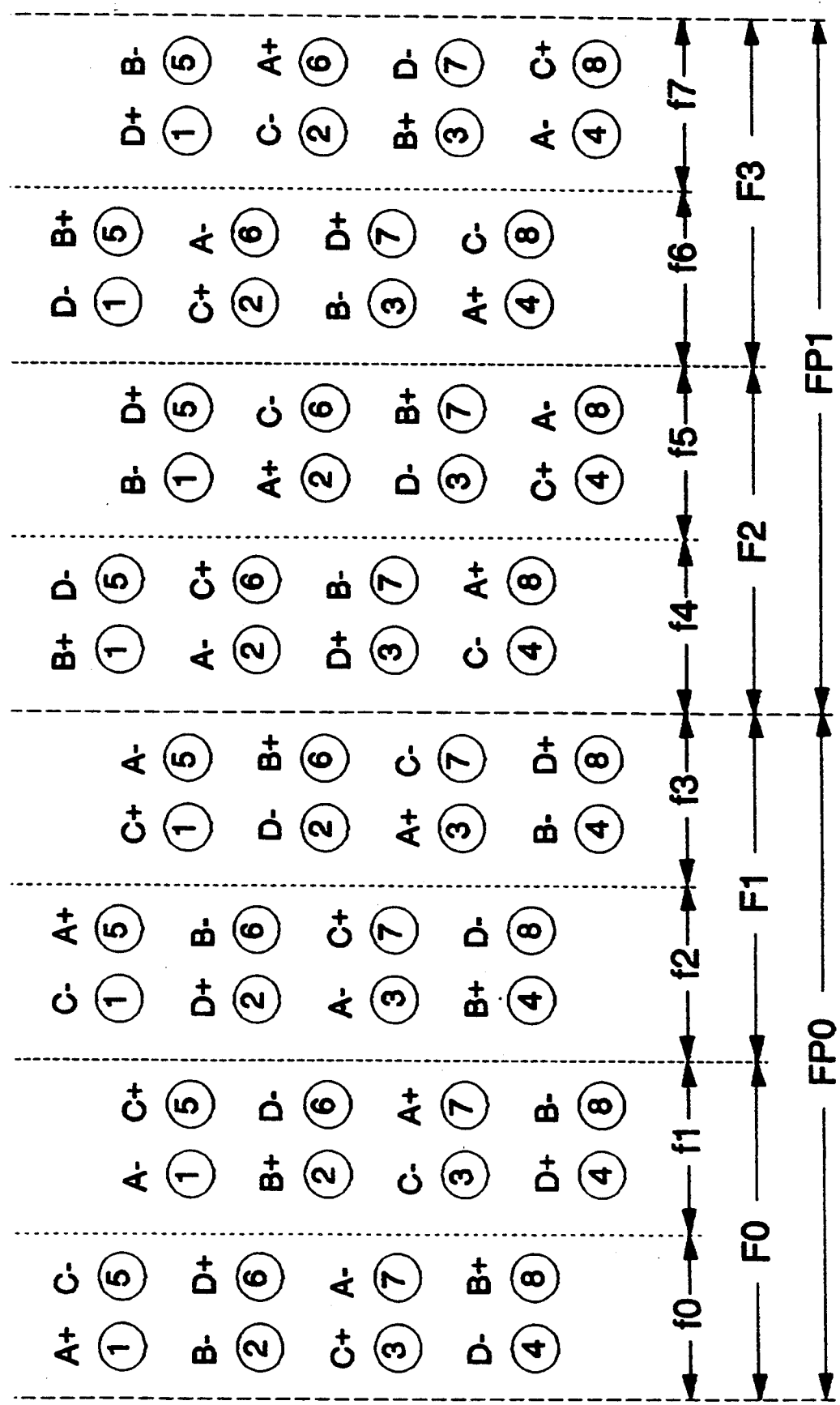
FIG. 10 illustrates temporal demultiplexing performed by the head channel encoder.

FIG. 10 illustrates the eight field head demultiplexing sequence output by the temporal demultiplexer 80. The vertical dashed lines separate the data for respective fields. The eight circles between pairs of dashed lines represent the eight spatially demultiplexed data processing channels (1-8). The letters A to D above the circles represent the allocation of the channels to the heads for respective fields. The "+" and "−" signs represent the upper and lower track portions (or sub-tracks) respectively (compare FIG. 4). At the bottom of FIG. 10, the field, frame and frame pair number are indicated. There are eight fields (fΦ-f7), four frames (F0-F4) and two frame pairs (FP0, FP1) in the eight field cycle. The sequence shown in FIG. 10 repeats every eight fields.

It will also be noted that the pattern of head channels in field zero of FIG. 10 corresponds to the top left hand block of eight pixels in FIG. 7A. FIG. 7A illustrates the relationship between the spatial positions of the pixels within the decorrelated image and the eight data processing channels whereas FIG. 10 represents the allocation of the channels to the heads for successive fields. The relationship of the data processing channels to the head sub-tracks (A+, A−. B+, B−, C+, C−, D+, D−) illustrated in FIG. 7A only applies to one of eight fields of input video (i.e. field 0). The temporal demultiplexer 80 changes the mapping of the data processing channels to the heads and a head tracks each field of video so as to temporally interleave the data processing channels among the heads. Thus, in an eight field sequence, each pixel will be allocated to each of the head sub-tracks in turn. The result of this is that the data for adjacent pixels can be distributed over the tape in a manner which enables efficient recovery from many of the types of errors which can occur in the recording of data on a video tape. Such errors include the failure of a particular head, for example, due to a build up of dirt and/or material from the tape, scratches in the tape and so on, as will be described later.

Figure 11:
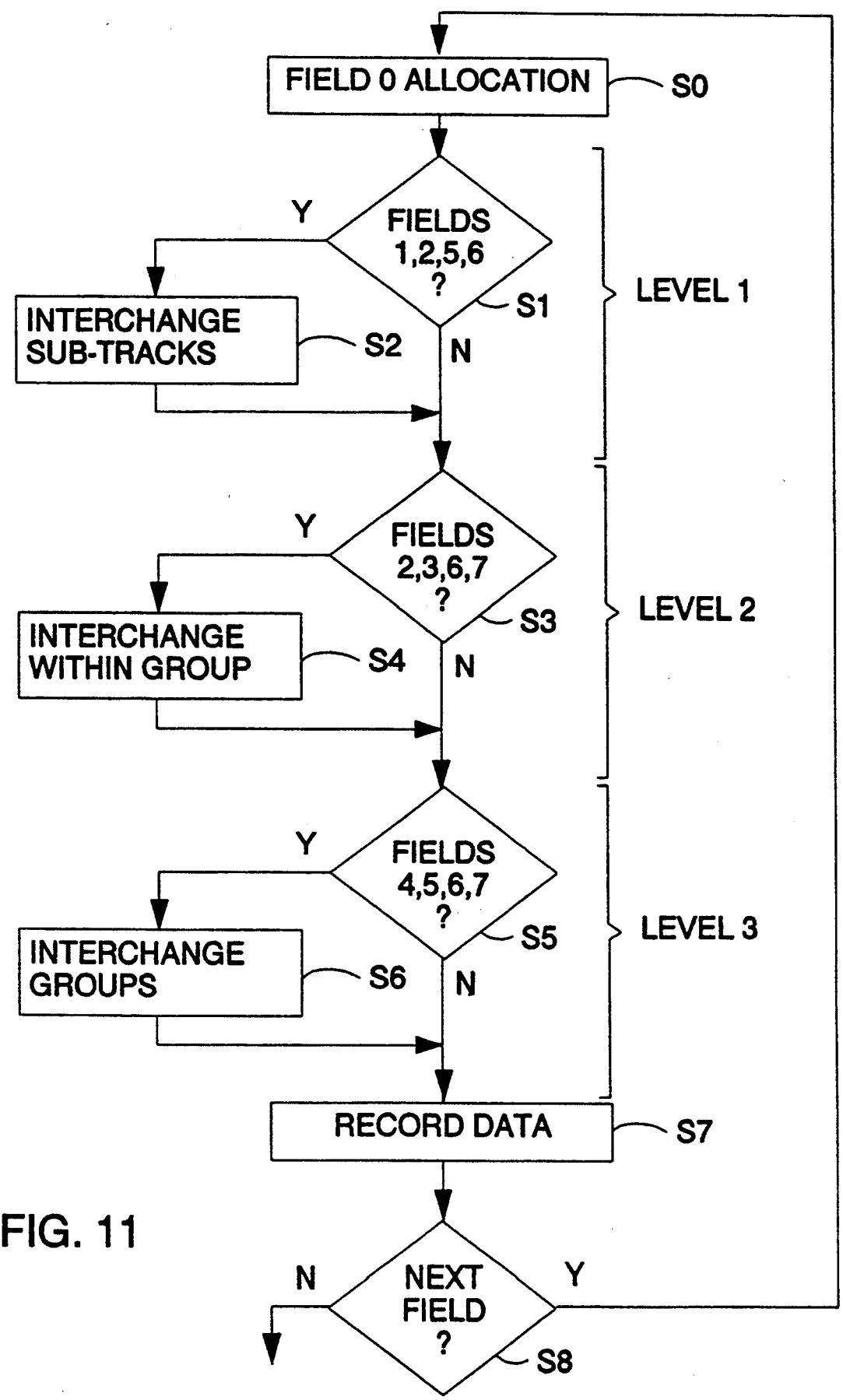
FIG. 11 is a flow diagram illustrating the operation of the temporal demultiplexer.

FIG. 11 is a flow diagram representing the logic behind the operation of the head channel encoder controller 58 for generating the temporal head demultiplexing sequence, which has been arranged such that it can be reduced to a three level separable process with respect to time. The separation into three levels makes the process of demultiplexing and multiplexing easier to implement. The aim of the demultiplexing process is to distribute data in a temporal manner between the heads such that more efficient concealment is possible on replay of the information from the tape. FIG. 11 explains how to arrive at the allocation of the data processing channels for each of the fields 1-7 in the eight field sequence with respect to the allocation for field 0.

For field f0 of FIG. 10 the eight separate data processing channels (0-7) are allocated to the upper (+) and lower (−) portions of the tape for the heads A, B, C and D as indicated in FIG. 9. This is represented by step S0 of FIG. 11.

For the first level of demultiplexing, if a current field in an eight field sequence is field F1, f2, f5 or f6 (step S2), then in step S3 the allocation of the data channels to the upper and lower track portions is interchanged. In other words, if in field f0 a channel is allocated to an upper portion of a track, then for fields 1, 2, 5 or 6 it is allocated to a lower portion of a track (and vice versa).

For the second level of demultiplexing, if a current field in the eight field sequence is field f2, f3, f6 or f7 (step S3), then the data processing channels are interchanged within a group of heads (step S4). In other words, if in field f0 a data processing channel is allocated to head A in fields f2, f3, f6 or f7, the data processing channel will be reallocated within a group to head C. Likewise head C will be switched to group A, head C to head D and head D to head B.

For the third stage of demultiplexing, if a current field in the eight-field sequence is field f4, f5, f6 or f7 (step S5), then the processing channel is switched between groups of heads in step S6. In other words, if in field f0 a data processing channel is allocated to heads A or C, it will be reallocated for fields f4, f5, f6 and f7 to heads B or D. Likewise an allocation to heads B or D is switched to heads A or C.

The data from the data processing channels are then recorded in step S7 in accordance with the allocation defined by steps Si to S6 above. If another field is to be processed (step S8), then the process of allocation from the initial allocation is repeated.

In practice, this distribution of the data processing channels to the heads is achieved by selective addressing of the output stores 74 A/C and 74 B/D of FIG. 8. The separation of the data for the head channels 38 and 40 (i.e. the third level demultiplexing for heads A/C and B/D respectively) is performed by writing the data to be recorded into the appropriate one of the output stores 74 A/C and 74 B/D. The separation of the data to the heads within a channel and the upper and lower portions of the head tracks (i.e. the first and second level demultiplexing into to A+, A−; C+, C− for head channel 38 and B+, B−; D+, D− for head channel 40) is performed by selective reading from the output stores 74 A/C, 74 B/D by the head channel encoder control logic 76 in accordance with the logic represented in FIG. 11.

The temporal demultiplexing sequence is chosen to enable reliable correction or concealment of errors which can occur during the tape recording and replay process. The sequence has to take account of the various replay modes of the tape recorder. For example, it is important to avoid the generation of artifacts and other effects during, for example, shuttle replay at various speeds.

The replay signal processing apparatus of FIG. 3 will now be described.

Figure 12:
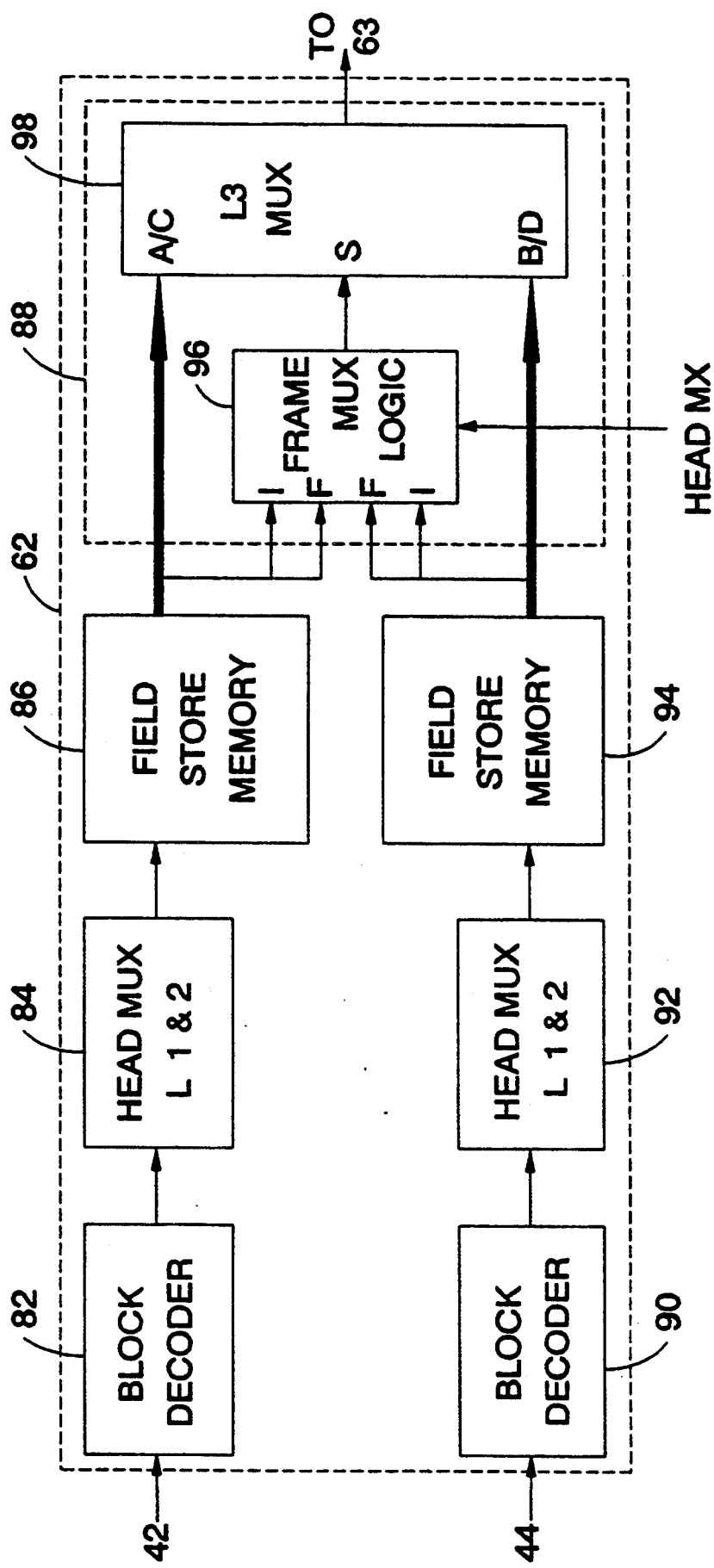
FIG. 12 is a schematic block diagram of a head channel decoder of the apparatus of FIG. 3.

FIG. 12 is a schematic block diagram of the head channel decoder 62 of FIG. B. The head channel decoder 62 performs the head multiplexing as a three stage or three level separable process. The three stages or levels of the separable process are represented in Table 1 to be found at the end of this description. In Table I the first level defines the allocation to the first or second portion of the track where "0" represents the same portion as for field f0 and "1" represents the other portion; the second level defines the allocation between the heads of a group (heads A and C form a first group, heads B and D form a second group) and "0" represents an allocation to the same head as for field f0 and "1" represents an allocation to the other head of a group; the third level defines the allocation between groups of heads (i.e. between group A/C and group B/D) and "0" represents an allocation to the same group as field f0 and "1" represents an allocation to the other group.

The head channel decoder receives the signals from the first group of heads, namely heads A and C, at a first input 42 and the signals from the second group of heads, namely heads B and D, at a second input 44.

The output from the heads A and C is supplied from the first input 42 to a first block decoder 82 which separates out the synchronization, address and error correction data from the inner and outer blocks received from the heads A and C. The block decoder decodes the inner blocks received from the tape. In particular, the block decoder extracts the synchronization information "S", the head code (A, B, C or D), the upper/lower sub-track code, and the field, frame and frame pair information "I" from each inner block. The block decoder also extracts the error correction codes "ECC" stored in the inner blocks and, where possible, uses the error correction codes to correct errors within the block. The actual process of error correction can be performed in a conventional manner using the error correction codes (e.g. Reed-Solomon correction codes mentioned above). Where it is not possible to correct the errors for a given inner block with the error correction codes, the first decoding circuit generates an error flag for that inner block.

The output from the first block decoding circuit 82 is passed to a first head multiplexer 84 which separates the data associated with the heads A and C. The data on the head channel 42 comprise a sequence of data from the upper portion of track A (A+), then data from the lower portion of track A (A−), then data from the upper portion of track C (C+), and then data from the lower portion of track C (C−). This sequence of data repeats once per field. The data arrive in this sequence because the heads A and C are displaced at 180° with respect to one another on the rotating head drum 24 and the drum 24 rotates once per field. Thus, the data provided at the first input alternate between periods when data come from head A and periods when data come from head C, these periods being separated by periods when no signal is generated. The data for data processing portions A+, A−, C+, C− can therefore readily be separated for storage in the field memory 86 using the synchronization data read from the blocks on the tape.

In particular the first head multiplexer 84 uses the inner block ID information "I", including the information about which head and track portion the block came from (A+, A−. B+, B− etc.) and information identifying the field, frame and frame pair from the eight field sequence to which the inner block relates in order to determine a location in a field store memory 86 A/C at which the data from the first head channel 42 are stored. The selective storage of the inner blocks in the field store memory 86 in response to the inner block ID information implements the first and second levels of multiplexing as represented in Table 1 (i.e. for the first head channel 42, multiplexing from the upper and lower track portions and the A and C heads).

The data from the second head replay channel 44 are processed in a similar manner by the block decoder 90 and the head multiplexer 92 for storage in the field store memory 94. The error correction codes "ECC" are used, where possible to correct errors in the inner blocks. The inner block ID information "I" is used to determine the location in the replay store 94 at which the data from the second head channel 44 are stored. The selective storage of the inner blocks in the field store memory 94 in response to the inner block ID information effectively performs the first and second levels of multiplexing as represented in Table 1 (i.e. for the second head channel 44, multiplexing from the upper and lower track portions and the B and D heads).

The data from the second head replay channel 44 are processed in a similar manner by the block decoder 90, the head multiplexer 92 and the field store memory 94.

Thus, the first and second stage, or level, of the multiplexing operations performed by each of the first head multiplexers are those illustrated in the first two rows of Table 1 to be found at the end of this description (i.e. the data relating to the upper and lower portions of the A and C heads within a group or the upper and lower portions of the B and D heads within the other group).

A third head multiplexer 88 then performs the third level of the multiplexing operation by separately selecting data from the first and second field memories 86 and 94 to multiplex the data from the first and second head multiplexers, whereby the data blocks for each of the eight data processing channels can be separated with data blocks for which no error correction was possible being labelled by error flags.

The third stage of multiplexing is performed with selective reading of data in the two field buffer memories synchronized with the output video rate. In order to correctly multiplex the data it is necessary to change the multiplex operation dependent on the frame number associated with the data being output. It will be remembered, with reference to FIG. 11, that the encoding or temporal demultiplexing between head channels, changes every other frame (i.e. for fields 0 and 4). In order to effect the third stage multiplexing, the third stage multiplexer comprises logic which is responsive to the data error flag, the frame pair identity, and also to a head multiplexing phase signal (referenced Head MX in FIG. 12) which forms part of the reference timing signals (REF) supplied to the replay signal processing apparatus for defining an output video rate. For each pair of heads (A/B and C/D) both error flags and frame pair ID's are input from the data blocks in the field memories to a logic circuit 96 (preferably a programmable array logic circuit PAL). Also input to the logic circuit 96 is the head MX signal which indicates which head pair A or B is due to be read. Likewise, the signal indicates which head pair C or D is to be read. This is illustrated in Table 2 at the end of this description.

Table 2 assumes that the frame pair ID is constant throughout any field; this will normally be true for error free play. However, this is not the case in a shuttle mode of operation of a video tape recorder because data from all four frames in an eight field sequence can become mixed together. This can also happen in play mode if the error correction fails and concealment is required, since the previously stored data may not be from the same frame of the four frame (or eight field) sequence. Accordingly, in the preferred embodiment of the invention, the head multiplexing process is performed on a sample-by-sample basis. Note that although data from any one inner block are always from the same frame, the read process addresses data from different inner blocks on a sample-by-sample basis in order to perform the outer error check process. The frame data may, therefore, change on a sample-by-sample basis and is dynamically selected on this basis by the head MX signal of Table 2.

Accordingly, the logic circuit 96 selects data either from the first field store, or buffer memory 86, or from the second field store, or buffer memory 94, according to the five inputs (i.e. the error flag and the frame ID from the first and second field buffers respectively and additionally the head MX signal). Tables 3a and 3b to be found at the end of this description illustrate how the logic circuit 96 responds to these five inputs (namely the head multiplex signal Head Mx, the frame pair number for the A/C head channel (FP A/C), the error flag for that channel (EF A/C), the frame pair number for the B/D head channel (FP B/D) and the error flag for that channel (EF B/D) in columns 1-5 to make the selection in column 6 in order to provide the output in column 7. "1" in an error flag column indicates an error, "0" in an error flag column indicates no error. Note that the error flags "EF" and the frame pair ID's "FP" are labelled simply "F" and "I", respectively, in FIG. 12 due to the lack of space. The comments in row 8 indicate how potential conflicts which arise in the tables are resolved. Where the comment "don't care" appears, either buffer memory could be selected with no effect on the principle of operation. However, in such cases, the table indicates an arbitrary default choice. Table 3a is for the head multiplexing for the A/C buffer memory in the third level multiplexer 98 and table 3b is for the B/D buffer memory in the third level multiplexer 98. The purpose of this multiplexing operation is to provide an output from the head channel decoder 62 in which the temporally demultiplexed signal from the tape is multiplexed to provide a signal in the format of the zero field of FIG. 10 (i.e. to recreate the spatial distribution indicated in FIG. 7A).

The output of the head channel decoder 62 can include an outer block decoder (not shown) which uses the outer error correction codes "E" for further correcting errors in the block replayed from tape.

The output of the head channel decoder 62 is then supplied to the entropy decoder 62 data processing channel by data processing channel and within each data processing channel on a sub-band by sub-band basis in a time multiplexed manner. The function of the entropy decoder 63 is to expand the compressed samples from the head channel decoder. Where, as described above, the entropy encoder employs a combination of run-length and Huffman encoding, the entropy decoder will comprise a complementary combination of a Huffman decoder and a run-length decoder. The details of the entropy decoder are not essential to the present invention. the entropy encoder should be such as to permit the expansion of the signals compressed by the entropy encoder 57 of FIG. 5.

The output of the entropy encoder is supplied to a spatial multiplex stage 64 which includes the replay store for the storage of the expanded data and address circuitry for ensuring the correct addressing thereof. The address circuitry applies the inverse of the spatial demultiplexed mapping applied by the spatial demultiplexer 56 in order to restore the order of the data for each field of video information as represented in FIG. 7A. The spatial multiplexer 64, including the replay store for the storage of data, could be included in the final stage of the entropy decoder 63.

When the data and error flags for a complete field have been received into the replay store, the spatial field is then processed by the concealment logic 65 (FIG. 6).

The concealment logic 65 passes data for which an error flag has not been set. Alternatively, the concealment logic 65 generates a substitute value from any available pixel values which are adjacent in time or space in accordance with an appropriate concealment strategy.

Where concealment is required, it can be achieved by interpolating adjacent pixels in the same field (the preferred approach when there is movement in the video images) or pixels at corresponding positions in preceding or subsequent fields or frames. These techniques are described in GB-A-2 140 189 mentioned previously. As is the case with GB-A-2 140 189, as the video data are sub-divided into processing channels for recording on the tape so that the video data are switched between the heads, concealment of pixel data due to head loss is possible. However, with the separation of the video data into twice the number of data processing channels as there are heads, with each channel being allocated to a head for half the time it takes to form a track, and cycling the allocation of the data processing channels to each of the half tracks over an eight field sequence, it is possible effectively to conceal data if an error such as a scratch on one half of the tape means that no data are recovered from that half of the tape.

Separate processing of luminance and chrominance signals can be provided by duplication of elements of the processing circuitry. Preferably the Cb or Cr components of the chrominance signals are separated to form left hand and right hand portions of a video image, as this aids analysis of the video data. The separation of the chrominance and luminance signals into duplicate paths was not described above for reasons of clarity of explanation. However, it will be apparent to the skilled person how to adapt the above description to provide duplicated chrominance and luminance processing, duplicated processing of chrominance and luminance being well understood to one skilled in the art.

Although, in the preferred embodiment, the video data are demultiplexed into eight channels which are then temporally demultiplexed for storage on tape, the invention is not limited to this specific application and other numbers of channels may be generated. For example, the video data may be demultiplexed into four channels which are then allocated to four heads in a temporal manner. In this case, the stage of multiplexing between upper and lower portions of a tape (i.e. for the first and second period during the operative phase of each head) may be omitted during both the demultiplexing and multiplexing operations. FIG. 7C illustrates the demultiplexing of the pixel samples in such case. Comparison of FIGS. 7A and 7C will indicate the lack of the '+' and '−' signs in FIG. 7C i.e. only one data processing channel is allocated to each head for each field. Also, as mentioned above, although the invention finds particular application to the processing of video data, it is not limited thereto.

Although the motivation for the present invention results from the intention to use compression for the storage of video information, the present invention is not limited thereto. Indeed, the present invention could be used for the storage of data in noncompressed form. In other words, other embodiments of the invention need not include the decorrelation and entropy encoder stages of the first embodiment. In particular, FIGS. 13 and 14 are schematic block diagrams giving an overview of record signal processing apparatus and replay signal processing apparatus, respectively, for a system employing the storage of digital signals in non-compressed form.

Figure 13:
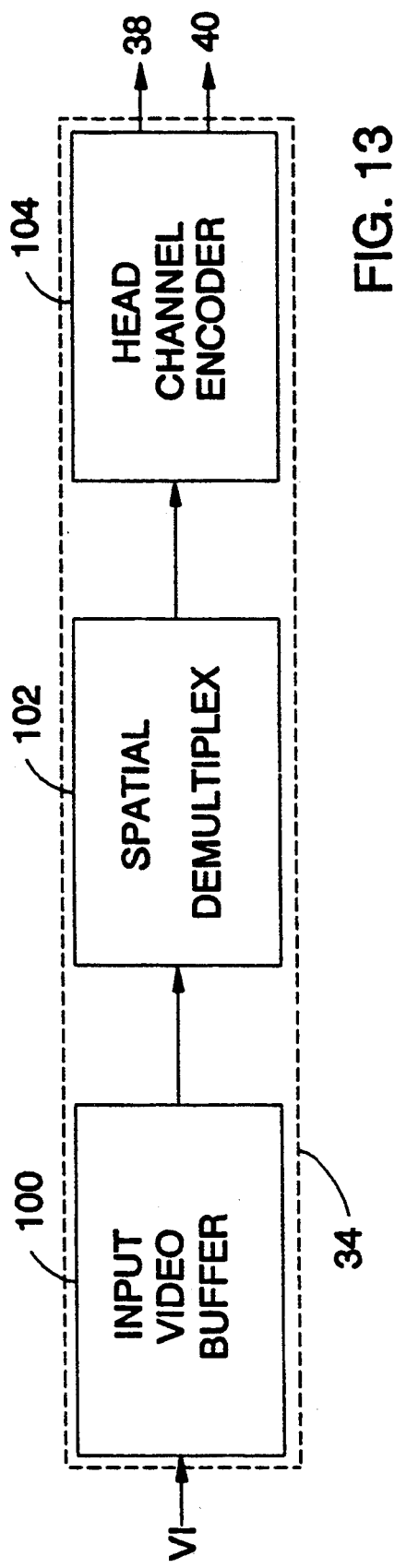
FIG. 13 is a schematic block diagram of a second example of a record signal processing apparatus.

In FIG. 13, the input digital video signal VI is supplied to the input video buffer 100. The spatial demultiplexer 102 controls the output from the video buffer 104 dividing the input video data, which in this embodiment forms the actual pixels, into a plurality (in the preferred embodiment eight) of data processing channels. The output from the spatial demultiplexer 102 is supplied to a head channel encoder 104 which performs error correction encoding and temporal demultiplexing of the decorrelated and compressed data for storage on tape via the two head channels 38 and 40 in a manner similar to that of the head channel encoder 58 of FIG. 5.

Figure 14:
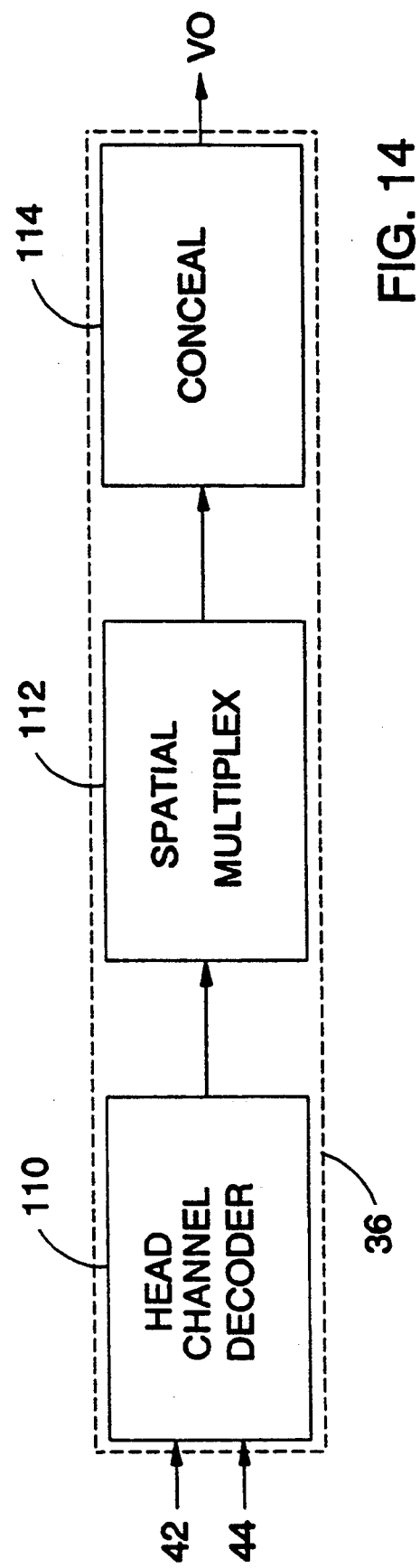
FIG. 14 is a schematic block diagram illustrating a second example of a replay signal processing apparatus.

In the replay signal processing apparatus in FIG. 14, the head channel decoder 110 performs the decoding of blocks of data from tape and the temporal multiplexing of the data from the head channels into the (eight) data processing channels. The output of the head channel decoder 110 is then passed to the spatial multiplexer 114 which essentially performs the inverse operation of the spatial demultiplexer 102. The output of the spatial multiplexer 114 comprises a stream of blocks of video data of which may contain data errors which could not be corrected by the error correction processing in the head channel decoder 110. A concealment processor 114 is employed to conceal data relating to the erroneous blocks in a manner similar to the concealment processor 65 of FIG. 6. However, in the case of the concealment processor 114, the data being concealed relate to actual pixel data in the spatial domain rather than samples in the transform domain. The output of the concealment processor 114 forms the output V0.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

TABLE 1

| Field No: | 0 | 1 | 2 | 3 | 4 | 5 | 6 | 7 |
|---|---|---|---|---|---|---|---|---|
| Upper/Lower (U = 0, L = 1) | 0 | 1 | 1 | 0 | 0 | 1 | 1 | 0 |
| A<>C, B<>D (A/B = 0, C/D = 1) | 0 | 0 | 1 | 1 | 0 | 0 | 1 | 1 |
| A<>B, C<>D (A/C = 0, B/D = 1) | 0 | 0 | 0 | 0 | 1 | 1 | 1 | 1 |

TABLE 2

| Head Mx | FP 0 | FP 1 |
|---|---|---|
| 0 | A/C | B/D |
| 1 | B/D | A/C |

TABLE 3a

| Head Mx | FP A/C | EF A/C | FP B/D | EF B/D | Select | EF Out | Comments |
|---|---|---|---|---|---|---|---|
| 0 | 0 | 0 | 0 | 0 | 0 A/C | 0 | |
| 0 | 0 | 0 | 0 | 1 | 0 A/C | 0 | |
| 0 | 0 | 0 | 1 | 0 | 0 A/C | 0 | Don't care-default A/C |
| 0 | 0 | 0 | 1 | 1 | 0 A/C | 0 | |
| 0 | 0 | 1 | 0 | 0 | 0 A/C | 1 | |
| 0 | 0 | 1 | 0 | 1 | 0 A/C | 1 | Don't care-default A/C |
| 0 | 0 | 1 | 1 | 0 | 1 B/D | 0 | |
| 0 | 0 | 1 | 1 | 1 | 0 A/C | 1 | Don't care- |

TABLE 3a-continued

| Head Mx | FP A/C | EF A/C | FP B/D | EF B/D | Select | EF Out | Comments |
|---|---|---|---|---|---|---|---|
| 0 | 1 | 0 | 0 | 0 | 0 A/C | 0 | default A/C Conflict-default A/C |
| 0 | 1 | 0 | 0 | 1 | 1 B/D | 0 | |
| 0 | 1 | 0 | 1 | 0 | 1 B/D | 0 | |
| 0 | 1 | 0 | 1 | 1 | 1 B/D | 1 | |
| 0 | 1 | 1 | 0 | 0 | 0 A/C | 1 | |
| 0 | 1 | 1 | 0 | 1 | 0 A/C | 1 | Don't care-default A/C |
| 0 | 1 | 1 | 1 | 0 | 1 B/D | 0 | |
| 0 | 1 | 1 | 1 | 1 | 1 B/D | 1 | |

TABLE 3b

| Head Mx | FP A/C | EF A/C | FP B/D | EF B/D | Select | EF Out | Comments |
|---|---|---|---|---|---|---|---|
| 1 | 0 | 0 | 0 | 0 | 1 B/D | 0 | |
| 1 | 0 | 0 | 0 | 1 | 1 B/D | 1 | |
| 1 | 0 | 0 | 1 | 0 | 1 B/D | 1 | Conflict-default B/D |
| 1 | 0 | 0 | 1 | 1 | 1 B/D | 1 | |
| 1 | 0 | 1 | 0 | 0 | 1 B/D | 0 | |
| 1 | 0 | 1 | 0 | 1 | 1 B/D | 1 | Don't care-default B/D |
| 1 | 0 | 1 | 1 | 0 | 0 A/C | 1 | |
| 1 | 0 | 1 | 1 | 1 | 1 B/D | 1 | Don't care-default B/D |
| 1 | 1 | 0 | 0 | 0 | 1 B/D | 0 | Don't care-default B/D |
| 1 | 1 | 0 | 0 | 1 | 0 A/C | 0 | |
| 1 | 1 | 0 | 1 | 0 | 0 A/C | 0 | |
| 1 | 1 | 0 | 1 | 1 | 0 A/C | 0 | |
| 1 | 1 | 1 | 0 | 0 | 1 B/D | 0 | |
| 1 | 1 | 1 | 0 | 1 | 1 B/D | 1 | Don't care-default B/D |
| 1 | 1 | 1 | 1 | 0 | 0 A/C | 1 | |
| 1 | 1 | 1 | 1 | 1 | 0 A/C | 1 | |

We claim:

1. Digital data processing apparatus for processing data to be recorded on a recording medium by a recorder comprising n×m heads organised as m group where each group comprises n record heads connected in common to a head channel for said group, said apparatus comprising:
   means for receiving data to be recorded;
   means for spatially demultiplexing a field of data samples comprising a plurality of lines of data samples into i×n×m data processing channels;
   means for processing said demultiplexed field of data samples in said data processing channels; and
   means for providing at least one predetermined allocation of said data processing channels to said m×n heads,
   wherein said spatial demultiplexing means logically divides said field of data samples into blocks of n×n×m data samples dimensioned n data samples by n×m lines and assigns corresponding data samples within each block to a respective one of said i×n×m channels.

2. Apparatus as claimed in claim 1 wherein said spatial demultiplexing means assigns said data processing channels such that, for each allocation by said allocating means of said data processing channels to said heads, each of said data samples of a row within said block is assigned to a respective one of said n heads of a group of heads.

3. Apparatus as claimed in claim 1 wherein said spatial demultiplexing means allocates said data processing channels such that, for each allocation by said allocating means of said data processing channels to said heads, each of said data samples of a column within a said block is assigned to a respective one of said n×m heads such that no two adjacent data samples in said column are allocated to a same group of heads.

4. Apparatus as claimed in claim 1 wherein n=2 and m=2.

5. Apparatus as claimed in claim 1 wherein i=2, said allocating means allocates two data processing channels to each of said heads for a field of data samples whereby two data processing channels are recorded by each head during respective first and second sub-periods of a period when that head is active for said field of data samples and said spatial demultiplexing means assigns one data sample from each block of data samples to a respective one of said i×n×m data processing channels.

6. Apparatus as claimed in claim 1 wherein i=2, said allocating means allocates two data processing channels to each of said heads for a field of data samples whereby two data processing channels are recorded by each head during respective first and second sub-periods of a period when that head is active for said field of data samples and said spatial demultiplexing means assigns data samples to said data processing channels such that, for each allocation by the allocating means of said data processing channels to said heads, alternate data samples within a row are assigned to a respective one of said first and second sub-periods.

7. Apparatus as claimed in claim 1 wherein the spatial demultiplexing means assigns: data samples 1, 3, 5, etc. on lines 1, 5, 9, etc. to a first data processing channel; data samples 1, 3, 5, etc. on lines 2, 6, 10, etc. to a second data processing channel; data samples 1, 3, 5, etc. on lines 3, 7, 11, etc. to a third data processing channel; data samples 1, 3, 5, etc. on lines 4, 8, 12, etc. to a fourth data processing channel; data samples 2, 4, 8, etc. on lines 1, 5, 9, etc. to a fifth data processing channel; data samples 2, 4, 8, etc. on lines 2, 6, 10, etc. to a sixth data processing channel; data samples 2, 4, 8, etc. on lines 3, 7, 11, etc. to a seventh data processing channel; and data samples 2, 4, 8, etc. on lines 4, 8, 12, etc. an eighth data processing channel.

8. Apparatus as claimed of claim 1 wherein i=1, said allocating means allocates one data processing channel to each of said heads for a field of data samples whereby one data processing channel is recorded by each head during a period when that head is active for the field of data samples and the spatial demultiplexing means assigns two data samples from each block of data samples to a respective one of said i×n×m data processing channels.

9. Apparatus as claimed in claim 1 wherein said allocating means switches said allocation of said data processing channels to said heads at successive timings to provide spatial multiplexing of said data processing channels, wherein each group of recording heads is connected via a said head channel to said allocating means and wherein said allocating means comprises means for reallocating said channels between heads of a head channel and means for reallocating said channels between head channels.

10. Apparatus as claimed in claim 9 wherein the heads of a head channel are operable in respective time periods and said allocating means reallocates said data processing channels between said heads for successive time periods.

11. Apparatus as claimed in claim 10 wherein, during a said time period, said allocating means allocates each of a plurality of data processing channels to a head channel during respective sub-periods within a said time period, whereby a plurality of said data processing channels are allocated sequentially to a head of that head channel operable during said time period.

12. Apparatus as claimed in claim 9 wherein said allocating means reallocates the channels to the heads for, successive fields of data samples in a repeating eight field sequence.

13. Apparatus as claimed in claim 1 wherein said means for processing the demultiplexed field of data samples in said data processing channels comprises means for-compressing said data samples in each of said data processing channels.

14. Apparatus as claimed in claim 1 wherein said allocation means records a block number, field, frame and frame pair identifiers and error correction information with said data samples.

15. Apparatus as claimed in claim 1 comprising memos for receiving said data to be recorded including means for decorrelating received fields of data, including storage means for storing a field of decorrelated data samples, wherein said spatial demultiplexing means comprises means for addressing said storage means to selectively access the decorrelated data samples to demultiplex said field of decorrelated data samples.

16. Apparatus as claimed in claim 1 wherein said data to be recorded is digital video data.

17. Data processing apparatus for processing data to be recorded on a recording medium by a recorder comprising 4 heads organised as 2 groups where each group comprises 2 record heads connected in common to a head channel for said group, said apparatus comprising:
    means for spatially demultiplexing a field of data samples comprising a plurality of lines of data samples into 4×i data processing channels;
    means for processing the demultiplexed field of data samples in said data processing channels; and
    means for allocating said data processing channels to said 4 heads, wherein said spatial demultiplexing means assigns a different set of data samples to each data processing channel such that, for each allocation by said allocating means of said data processing channels to said heads, each set of data samples includes alternate data samples on every fourth line.

18. Apparatus as claimed in claim 17 wherein i=2, said allocating means allocates two data processing channels to each of said heads for a field of data samples whereby two data processing channels are recorded by each head during respective first and second sub-periods of a period when that head is active for said field of data samples and said spatial demultiplexing means assigns data samples to said data processing channels such that, for each allocation by the allocating means of said data processing channels to said heads, alternate data samples within a row are assigned to a respective one of said first and second sub-periods.

19. Apparatus as claimed in claim 17 wherein the spatial demultiplexing means assigns: data samples 1, 3, 5, etc. on lines 1, 5, 9, etc. to a first data processing channel; data samples 1, 3, 5, etc. on lines 2, 6, 10, etc. to a second data processing channel; data samples 1, 3, 5, etc. on lines 3, 7, 11, etc. to a third data processing channel; data samples 1, 3, 5, etc. on lines 4, 8, 12, etc. to a fourth data processing channel; data samples 2, 4, 8, etc. on lines 1, 5, 9, etc. to a fifth data processing channel; data samples 2, 4, 8, etc. on lines 2, 6, 10, etc. to a sixth data processing channel; data samples 2, 4, 8, etc. on lines 3, 7, 11, etc. to a seventh data processing channel; and data samples 2, 4, 8, etc. on lines 4, 8, 12, etc. an eighth data processing channel.

20. Apparatus as claimed in claim 17 wherein said allocating means switches said allocation of said data processing channels to said heads at successive timings to provide spatial multiplexing of said data processing channels, wherein each group of recording heads is connected via a said head channel to said allocating means and wherein said allocating means comprises means for reallocating said channels between heads of a head channel and means for reallocating said channels between head channels.

21. Apparatus as claimed in claim 20 wherein the heads of a head channel are operable in respective time periods and said allocating means reallocates said data processing channels between said heads for successive time periods.

22. Apparatus as claimed in claim 20 wherein, during a said time period, said allocating means allocates each of a plurality of data processing channels to a head channel during respective sub-periods within a said time period, whereby a plurality of said data processing channels are allocated sequentially to a head of that head channel operable during said time period.

23. Apparatus as claimed in claim 20 wherein said allocating means reallocates the channels to the heads for successive fields of data samples in a repeating eight field sequence.

24. Apparatus as claimed in claim 17 wherein said means for processing the demultiplexed field of data samples in said data processing channels comprises means for compressing said data samples in each of said data processing channels.

25. Apparatus as claimed in claim 17 wherein said allocation means records a block number, field, frame and frame pair identifiers and error correction information with said data samples.

26. Apparatus as claimed in claim 17 comprising means for receiving said data to be recorded including means for decorrelating received fields of data, including storage means for storing a field of decorrelated data samples, wherein said spatial demultiplexing means comprises means for addressing said storage means to selectively access the decorrelated data samples to demultiplex said field of decorrelated data samples.

27. Apparatus as claimed in claim 17 wherein said data to be recorded is digital video data.

28. Data processing apparatus for processing data to be recorded on a recording medium by a recorder comprising n×m heads organised as m groups where each group comprises n record heads connected in common to a head channel for said group, said apparatus comprising:
    means for receiving data to be recorded;
    means for spatially demultiplexing a field of data samples comprising a plurality of lines of data samples into i×n×m data processing channels;
    means for processing the demultiplexed field of data samples in said data processing channels; and
    means for allocating the data processing channels to m×n heads, wherein said allocating means switches allocation of said data processing channels to said heads at successive timings to provide spatial multiplexing of said data processing channels and wherein said allocating means comprises means for reallocating said channels between heads of a said head channel and means for reallocating said channels between head channels.

29. Apparatus as claimed in claim 28 wherein the heads of a head channel are operable in respective time periods and said allocating means reallocates said data processing channels between said heads for successive time periods.

30. Apparatus as claimed in claim 28 wherein, during a said time period, said allocating means allocates each of a plurality of data processing channels to a head channel during respective sub-periods within a said time period, whereby a plurality of said data processing channels are allocated sequentially to a head of that head channel operable during said time period.

31. Apparatus as claimed in claim 28 wherein said allocating means reallocates the channels to the heads for successive fields of data samples in a repeating eight field sequence.

32. Apparatus as claimed in claim 28 wherein said means for processing the demultiplexed field of data samples in said data processing channels comprises means for compressing said data samples in each of said data processing channels.

33. Apparatus as claimed in claim 28 wherein said allocation means records a block number, field, frame and frame pair identifiers and error correction information with said data samples.

34. Apparatus as claimed in claim 28 comprising means for receiving said data to be recorded including means for decorrelating received fields of data, including storage means for storing a field of decorrelated data samples, wherein said spatial demultiplexing means comprises means for addressing said storage means to selectively access the decorrelated data samples to demultiplex said field of decorrelated data samples.

35. Apparatus as claimed in claim 28 wherein said data to be recorded is digital video data.

36. Data processing apparatus for a digital player comprising a $n \times m$ replay heads for replaying information processed by a record processing apparatus and recorded on a recording medium in a spatially demultiplexed manner, said replay heads being connected to form m groups each of n heads, said data processing apparatus comprising:
  head multiplexing means for multiplexing said recorded data into $i \times n \times m$ data processing channels;
  means for processing said data in respective data processing channels; and
  means for subsequently recombining said processed data to form output data, wherein said means for subsequently recombining said processed data comprises spatial multiplexing means for generating a field of data samples having a plurality of lines of data samples, said spatial multiplexing means logically dividing said field of data samples into a plurality of blocks of $n \times n \times m$ data samples dimensioned n data samples by $n \times m$ lines and selecting corresponding data samples within each block from a respective one of the $i \times n \times m$ channels.

37. Apparatus as claimed in claim 36 wherein said spatial multiplexing means assigns data from said data processing channels such that each of said data samples in a row within each block are defined by data from a respective one of said n heads of a group of heads.

38. Apparatus as claimed in claim 36 wherein said spatial multiplexing means assigns data from said data processing channels such that each of said data samples of a column within said block are defined by data from a respective one of said $n \times m$ heads such that no two adjacent data samples in said column receive data from a same group of heads.

39. Apparatus as claimed in claim 36 wherein $n=2$ and $m=2$.

40. Apparatus as claimed in claim 36 wherein $i=2$ and said spatial multiplexing means derives each of said data samples for a block of data samples from a respective one of the $i \times n \times m$ data processing channels.

41. Apparatus as claimed in claim 36 wherein $i=2$, said head multiplexing means selects data for each of two data processing channels from each head during respective first and second sub-periods of a period when that head is active for a field of data samples and said spatial multiplexing means assigns data samples to said data processing channels such that alternate data samples within a row are derived from a respective one of said first and second sub-periods.

42. Apparatus as claimed in claim 36 wherein said spatial multiplexing means derives: data samples 1, 3, 5, etc. on lines 1, 5, 9, etc. from a first data processing channel; data samples 1, 3, 5, etc. on lines 2, 6, 10, etc. from a second data processing channel; data samples 1, 3, 5, etc. on lines 3, 7, 11, etc. from a third data processing channel; data samples 1, 3, 5, etc. on lines 4, 8, 12, etc. from a fourth data processing channel; data samples 2, 4, 8, etc. on lines 1, 5, 9, etc. from a fifth data processing channel; data samples 2, 4, 8, etc. on lines 2, 6, 10, etc. from a sixth data processing channel; data samples 2, 4, 8, etc. on lines 3, 7, 11, etc. from a seventh data processing channel; and data samples 2, 4, 8, etc. on lines 4, 8, 12, etc. from an eighth data processing channel.

43. Apparatus as claimed in claim 36 wherein $i=1$, said head multiplexing means selects data for each data processing channel from a respective one of said heads for each field of data samples and said spatial multiplexing means derives two data samples for a block of data samples from a respective one of said $i \times n \times m$ data processing channels.

44. Apparatus as claimed in claim 36 wherein said head multiplexing means switches said multiplexing of said data processing channels from said heads at successive timings to temporally multiplex said data from said heads into said data processing channels.

45. Apparatus as claimed in claim 36 wherein said data samples are stored in compressed form on tape, said means for processing said data in respective data processing channels includes means for decompressing the compressed data.

46. Apparatus as claimed in claim 45 comprising means for concealing errors.

47. Apparatus as claimed in claim 46 wherein said means for recombining said processed data comprises interpolation means connected to receive an output of said error concealment means.

48. Apparatus as claimed in claim 36 wherein said recorded data represents video data.

49. Digital data processing apparatus comprising:
  record processing apparatus for processing data to be recorded on a recording medium by a recorder comprising $n \times m$ heads organised as m groups where each group comprises n record heads connected in common to a head channel for said group, said record processing apparatus comprising:
  means for receiving data to be recorded;

means for spatially demultiplexing a field of data samples comprising a plurality of lines of data samples into i×n×m data processing channels;

means for processing said demultiplexed field of data samples in said data processing channels; and means for providing at least one predetermined allocation of said data processing channels to said m×n heads, wherein said spatial demultiplexing means logically divides said field of data samples into blocks of n×n×m data samples dimensioned n data samples by n×m lines and assigns corresponding data samples within each block to a respective one of said i×n×m channels; and/or replay processing apparatus for a digital player comprising a n×m replay heads for replaying information processed by said record processing apparatus and recorded on a recording medium in a spatially demultiplexed manner, said replay heads being connected to form m groups each of n heads, said replay processing apparatus comprising:

head multiplexing means for multiplexing said recorded data into i×n×m data processing channels;

means for processing said data in respective data processing channels; and means for subsequently recombining said processed data to form output data, wherein said means for subsequently recombining said processed data comprises spatial multiplexing means for generating a field of data samples having a plurality of lines of data samples, said spatial multiplexing means logically dividing said field of data samples into a plurality of blocks of n×n×m data samples dimensioned n data samples by n×m lines and selecting corresponding data samples within each block from a respective one of the i×n×m channels.

50. Digital recording and/or playback apparatus comprising a tape transport including a plurality of heads on a rotating head mechanism for recording and-/or replaying a tape with slanting tracks which extend diagonally across said tape and digital data processing apparatus as claimed in claim 49.

51. Apparatus as claimed in claim 50 wherein said heads of a group are disposed on said rotating head mechanism at a substantially equal angular spacing with respect to one another.

52. Apparatus as claimed in claim 51 wherein respective heads from each of said groups are disposed substantially adjacent one another on said rotating head mechanism.

53. Apparatus as claimed in claim 50 wherein, in use, each head traces a slanting track across a tape during a time period when said head is operative and wherein, during a said time period, said allocating means sequentially allocates two data processing channels to a head during respective sub-periods within said time period, whereby a first of said two data processing channels is allocated to a first portion of a track traced by said head and a second data processing channel is allocated to a second portion of a track traced by said head.

54. Apparatus as claimed in claim 50 wherein, in use, each head traces a slanting track across a tape during a time period when said head is operative and wherein, during a said time period, said head multiplexing means sequentially selects data for two data processing channels from said group of heads during respective sub-periods within said time period, whereby data for a first of said two data processing channels is derived from a first portion of a track traced by said head and data for a second data processing channel is derived from a second portion of a track traced by said head.

* * * * *